United States Patent
Sulai et al.

(10) Patent No.: US 10,509,228 B1
(45) Date of Patent: Dec. 17, 2019

(54) LOW FIELD MYOPIA FOR ARTIFICIAL REALITY SYSTEMS

(71) Applicant: Facebook Technologies, LLC, Menlo Park, CA (US)

(72) Inventors: Yusufu Njoni Bamaxam Sulai, Bothell, WA (US); Brian Wheelwright, Sammamish, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 161 days.

(21) Appl. No.: 15/849,345

(22) Filed: Dec. 20, 2017

(51) Int. Cl.
    *G09G 5/00* (2006.01)
    *G02B 27/01* (2006.01)
    *G06F 3/01* (2006.01)
    *G06T 15/20* (2011.01)

(52) U.S. Cl.
    CPC .......... G02B 27/0172 (2013.01); G06F 3/011 (2013.01); G06F 3/012 (2013.01); G06F 3/013 (2013.01); G06T 15/20 (2013.01); *G02B 2027/0185* (2013.01)

(58) Field of Classification Search
    CPC .......... G06F 3/011; G06F 3/012; G06F 3/013; G06F 3/016
    See application file for complete search history.

(56) References Cited

U.S. PATENT DOCUMENTS

| | | | |
|---|---|---|---|
| 9,557,568 B1 * | 1/2017 | Ouderkirk | G02B 5/3025 |
| 9,835,777 B2 * | 12/2017 | Ouderkirk | G02B 5/3025 |
| 10,007,035 B2 * | 6/2018 | Ouderkirk | G02B 5/3025 |
| 10,203,762 B2 * | 2/2019 | Bradski | G02B 27/225 |
| 10,302,950 B2 * | 5/2019 | Ouderkirk | G02B 5/3025 |
| 10,338,400 B2 * | 7/2019 | Connor | G02B 27/2278 |
| 2019/0094981 A1 * | 3/2019 | Bradski | H04N 13/204 |
| 2019/0179409 A1 * | 6/2019 | Jones | G06F 3/013 |
| 2019/0235235 A1 * | 8/2019 | Ouderkirk | G02B 27/0081 |

OTHER PUBLICATIONS

Hoffman, David M., et al. "Vergence—Accommodation Conflicts Hinder Visual Performance and Cause Visual Fatigue." Journal of Vision, 2008, 30 pages, 33.1-3330, vol. 8.3.

Shibata, T. et al. "The Zone of Comfort: Predicting Visual Discomfort with Stereo Displays," Journal of Vision, 2011, 29 pages, vol. 11, No. 8.

* cited by examiner

*Primary Examiner* — Vijay Shankar
(74) *Attorney, Agent, or Firm* — Fenwick & West LLP

(57) ABSTRACT

A head-mounted display (HMD) presented herein comprises an electronic display and an optical assembly. The electronic display is configured to emit image light. The optical assembly is configured to direct the image light to an eye-box of the HMD corresponding to a location of a user's eye. The electronic display is positioned with respect to an optical axis of the HMD such that a first portion of the image light emitted by a first portion of the electronic display and a second portion of the image light emitted by a second portion of the electronic display appear to originate at different distances from the optical assembly such that the optical assembly generates at least a first image plane associated with the first portion of the electronic display and a second image plane associated with the second portion of the electronic display.

20 Claims, 17 Drawing Sheets

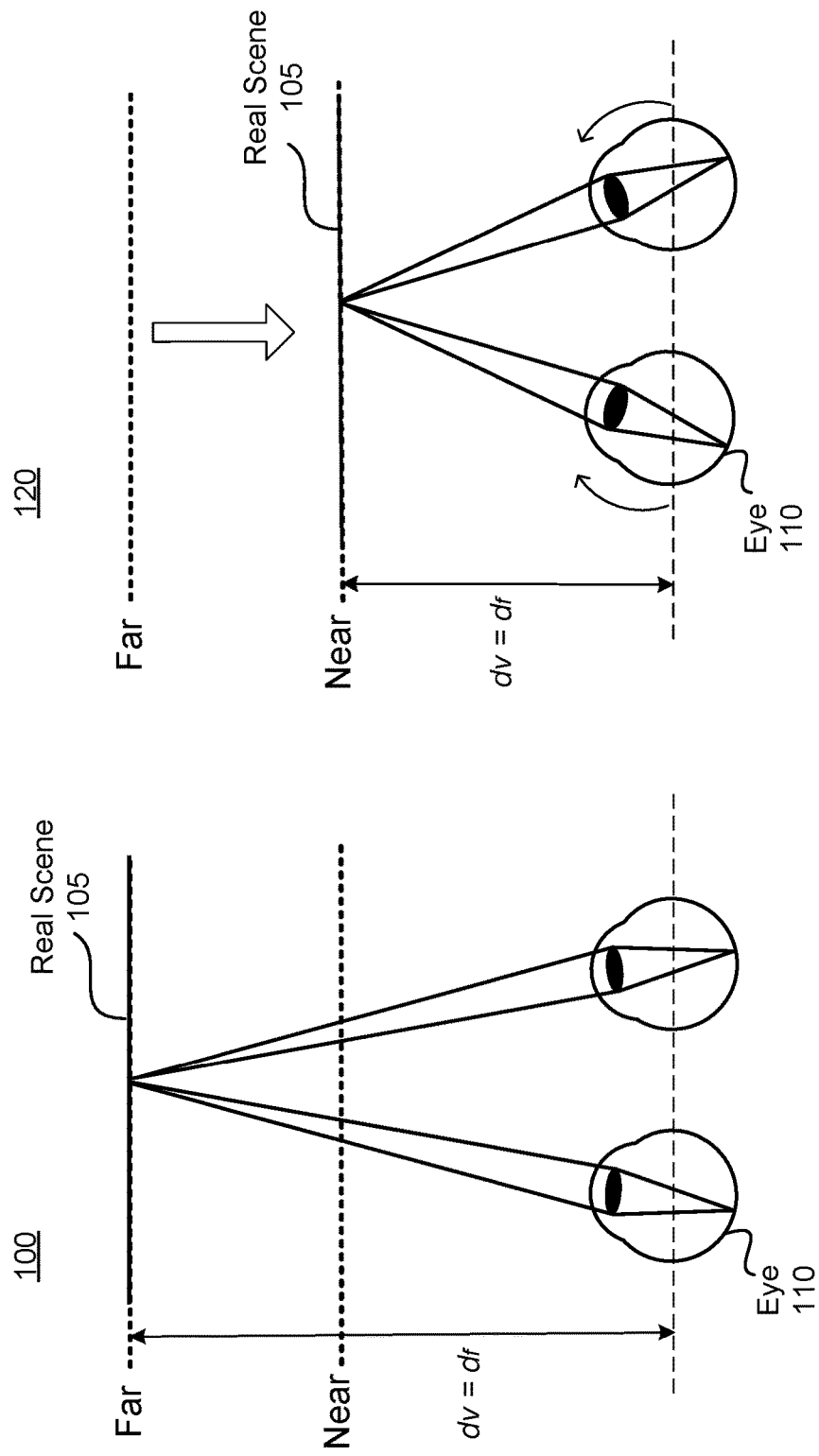
FIG. 1A (Real World)

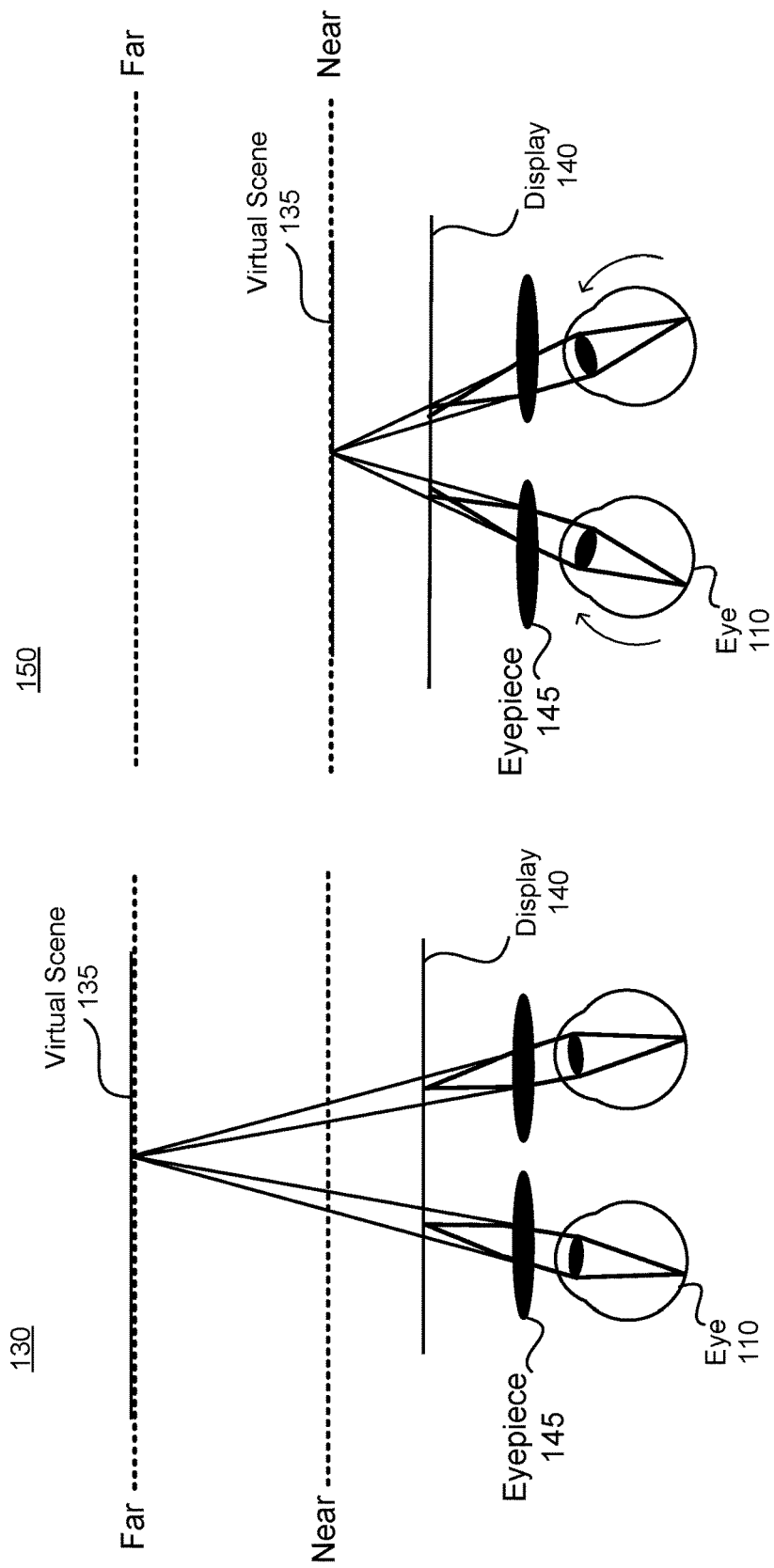

LOW FIELD MYOPIA FOR ARTIFICIAL REALITY SYSTEMS

BACKGROUND

The present disclosure generally relates to displaying content to a user wearing a head-mounted display (HMD) as part of an artificial reality system, and specifically relates to low field myopia for artificial reality systems.

Vergence-accommodation conflict is a phenomenon that occurs to users of virtual headsets such as HMDs. Typically, eyes converge (rotate toward one another) to focus on closer objects and diverge (rotate away from one another) to focus on objects that are further away. The vergence therefore represents the simultaneous movement of both eyes in opposite directions to obtain or maintain single binocular vision. Accommodation is coupled with vergence, and is the process where the lenses of the eyes focus on a close or far away object. During accommodation of an eye, a crystalline lens of the eye changes optical power to maintain a clear image or focus on an object as the object's distance varies. In HMD systems, vergence and accommodation processes are decoupled. In fixed-focused HMD systems, the user's eyes verge to a virtual object, but the accommodation stimulus is incorrect for near objects. The eyes may accommodate to the fixed focus distance of a display in the HMD, conflicting with the verged distance to the virtual object. More often the eyes will accommodate for a near object, which causes image blur since the virtual object distance is fixed. The decoupling of vergence and accommodation processes can cause the user to feel uncomfortable, disoriented, or nauseous. Furthermore, different users wearing the same HMD have different accommodation abilities, e.g., in accordance with an age of a user. In general, older people have less ability to accommodate than younger people, i.e., an accommodative range of older people is smaller than that of younger people. Therefore, it is desirable to design an optical assembly for integration into a HMD that can efficiently drive the accommodation for different users, which would also mitigate the vergence-accommodation conflict.

SUMMARY

Embodiments of the present disclosure support a head-mounted display (HMD) comprising an electronic display and an optical assembly. The electronic display configured to emit image light. The optical assembly is configured to direct the image light to an eye-box of the HMD, the eye-box corresponding to a location of a user's eye. The electronic display is positioned with respect to an optical axis of the HMD such that a first portion of the image light emitted by a first portion of the electronic display and a second portion of the image light emitted by a second portion of the electronic display appear to originate at different distances from the optical assembly such that the optical assembly generates at least a first image plane associated with the first portion of the electronic display and a second image plane associated with the second portion of the electronic display.

BRIEF DESCRIPTION OF THE DRAWINGS

FIG. 1A shows the relationship between vergence and eye focal length (accommodation) in the real world.

FIG. 1B shows the conflict between vergence and eye focal length (accommodation) in a three-dimensional display screen.

Figure 2A:
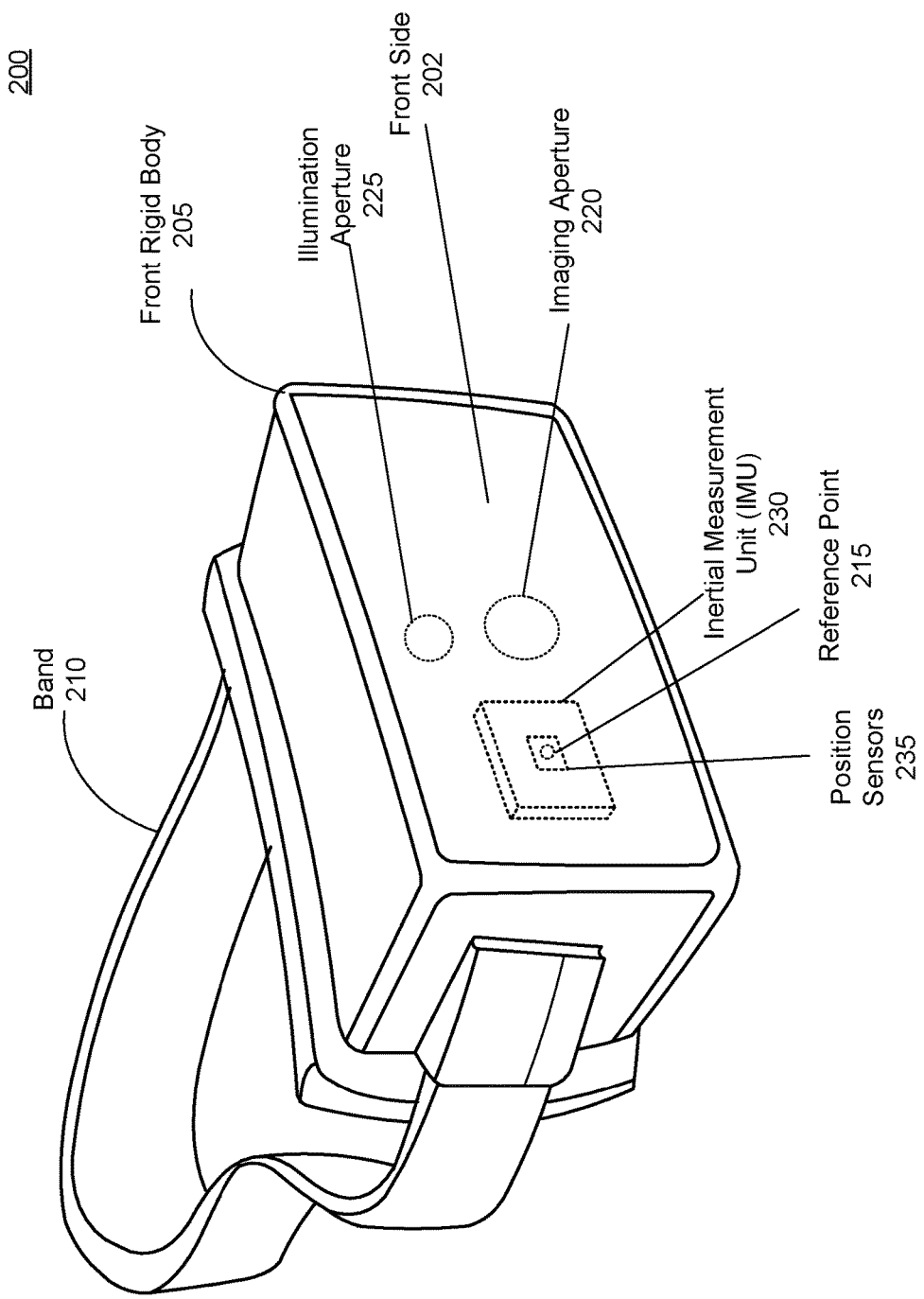
FIG. 2A is a diagram of a head-mounted display (HMD), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

A HMD displays content to a user. The HMD may be part of an artificial reality system. The HMD includes an optical assembly and an electronic display. In some embodiments, the optical assembly of the HMD includes a bifocal optical element. The bifocal optical element has a specific optical power except for a portion of the bifocal optical element that is formed to have less optical power. Thus, the portion of the bifocal optical element is implemented as a power reducer. In some embodiments, the power reducer is positioned below an optical axis of the HMD. For example, the user of the HMD would gaze down (i.e., below the optical axis) in order to look through the power reducer. The content presented through the power reducer allow users of different accommodative ranges to view content in at least a first image plane and a second image plane, i.e., an image plane for content not viewed through the power reducer and an image plane for other content viewed through the power reducer. The power reducer does this by setting an accommodative range between the first and second image plane such that a broader range of users (e.g., children and adults) are able to focus on either image plane. In this way, the bifocal element generates two separate image planes that are at different image distances. Users having different ranges of accommodation (e.g., an adult and a child) are able to focus on both of the image planes, thereby expanding a size of a user base for the HMD system. Moreover, as the bifocal element is a passive device, it is relatively simple and has a small form factor, both of which are advantages in implanting the bifocal element in an HMD. Additionally, the bifocal element may also mitigate vergence-accommodation conflict.

Vergence-accommodation conflict is a problem in many virtual reality systems. Vergence is the simultaneous movement or rotation of both eyes in opposite directions to obtain or maintain single binocular vision and is linked to accommodation of the eye. Under normal conditions, when human eyes change fixation from one object to another object at a distance, the eyes automatically change focus (by changing the shape of the crystalline lens) to provide accommodation at the new distance or vergence depth of the new object. Furthermore, in general, older people have less ability to accommodate than younger people, i.e., older people in general have a smaller accommodative range than younger people. Therefore, older users wearing a HMD typically would not need to look at content presented on a display through the power reducer. However, younger people having a larger accommodative range should view content that appears further through the power reducer in order to better accommodate when they continue viewing content that appears closer.

In some embodiments, to mitigate vergence-accommodation conflict, the electronic display of the HMD is configured to present content in two image planes. The electronic display can be implemented to have a near and far focal portion to mitigate vergence-accommodation conflict in both users with a large range of accommodation as well as users with a more limited range of accommodation. The near focal portion is generally positioned in a lower portion of a field-of-view of the HMD. In one embodiment, the electronic display provides two image planes by tilting (or bending) the electronic display with respect to the optical assembly. In other embodiment, the electronic display provides two image planes by bending the electronic display with respect to the optical assembly. In yet other embodiments, a fiber taper (also referred to as a fiber optic faceplate) or a wedge (both of which may be shaped) that is coupled to the electronic display may be used to provide a localized shift in virtual image distance. In one or more embodiments, the optical assembly may include a lens that includes a region having a reduced optical power with respect to the rest of the lens. The region of reduced optical power may correspond to the near focal portion.

FIG. 1A shows the relationship between vergence and eye focal length (accommodation) in the real world. In the example 100 of FIG. 1A, the user is looking at a real scene 105 (e.g., that includes one or more real objects) located far from the user, i.e., the scene 105 located far from the user is in focus. In the same time, user's eyes 110 are verged on the far real scene 105 and gaze lines from the user's eyes 110 intersect at the real scene 105. Thus, the vergence distance ($d_v$) equals the accommodation (focal) distance ($d_f$) in the example 100. In the example 120 of FIG. 1A, when the real scene 105 (e.g., the one or more real objects) is moved closer to the user, as indicated by the arrow in FIG. 1A, each eye 110 rotates inward (i.e., converge) to stay verged on the real scene 105. As the real scene 105 gets closer in the example 120, the eyes 110 have to "accommodate" to the closer distance by changing the shape of the crystalline lens to reduce the focal length or increase the optical power. Thus, under normal conditions in the real world (and for young people), the vergence distance ($d_v$) still equals the accommodation distance ($d_f$) when looking into near objects, i.e., the vergence and accommodation are coupled in the real world.

FIG. 1B shows an example conflict between vergence and accommodation that can occur with stereoscopic three-dimensional displays, e.g., fixed-focus HMDs. In the example 130 of FIG. 1B, a user is looking at a virtual scene 135 (e.g., composed of one or more virtual objects) displayed on a 3D electronic display 140. An eyepiece 145 may be positioned in front of each eye 110. The user's eyes 110 are verged on and gaze lines from the user's eyes 110 intersect at the virtual scene 135, which is at a greater distance from the user's eyes 110 than the 3D electronic display 140. In the example 150 of FIG. 1B, the virtual scene 135 is rendered on the 3D electronic display 140 to appear closer to the user, each eye 110 again rotates inward (e.g., as shown by arrows in FIG. 1B) to stay verged on the virtual scene 135. The eyes 110 accommodate as usual when verging to the near virtual scene 135, but the accommodation stimulus is incorrect (e.g., for young people) and the focus distance of the image is not sufficiently reduced. Thus, the focus is still distant and the virtual scene 135 presented on the 3D electronic display 140 appears blurry. Thus, instead of increasing the optical power to accommodate for the closer vergence depth, the eyes 110 maintain accommodation at a distance associated with the 3D electronic display 140. This discrepancy between vergence depth and focal length caused by decoupling of vergence and accommodation in stereoscopic three-dimensional displays is referred to as "vergence-accommodation conflict." A user experiencing only vergence or accommodation and not both will eventually experience some degree of fatigue and nausea, which is undesirable for virtual reality system creators. Embodiments of the present disclosure relate to an optical assembly configured to correct for optical power during accommodation in the fixed-focus HMDs and mitigate vergence-accommodation conflict for users of different age. The optical assembly correcting for optical power during accommodation may be part of the eyepiece 145.

FIG. 2A is a diagram of a HMD 200, in accordance with one or more embodiments. The HMD 200 may be part of an artificial reality system. In embodiments that describe an AR system and/or a MR system, portions of a front side 202 of the HMD 200 are at least partially transparent in the visible band (~380 nm to 750 nm), and portions of the HMD 200 that are between the front side 202 of the HMD 200 and an eye of the user are at least partially transparent (e.g., a partially transparent electronic display). The HMD 200 includes a front rigid body 205, a band 210, and a reference point 215. The HMD 200 may also include a depth camera assembly (DCA) configured to determine depth information of a local area surrounding some or all of the HMD 200. The HMD 200 may also include an imaging aperture 220 and an illumination aperture 225, and an illumination source of the DCA emits light (e.g., a structured light pattern) through the illumination aperture 225. An imaging device of the DCA captures light from the illumination source that is reflected from the local area through the imaging aperture 220.

The front rigid body 205 includes one or more electronic display elements (not shown in FIG. 2A), one or more integrated eye tracking systems (not shown in FIG. 2), an Inertial Measurement Unit (IMU) 230, one or more position sensors 235, and the reference point 215. In the embodiment shown by FIG. 2A, the position sensors 235 are located within the IMU 230, and neither the IMU 230 nor the position sensors 235 are visible to a user of the HMD 200. The IMU 230 is an electronic device that generates IMU data based on measurement signals received from one or more of the position sensors 235. A position sensor 235 generates one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

Figure 2B:
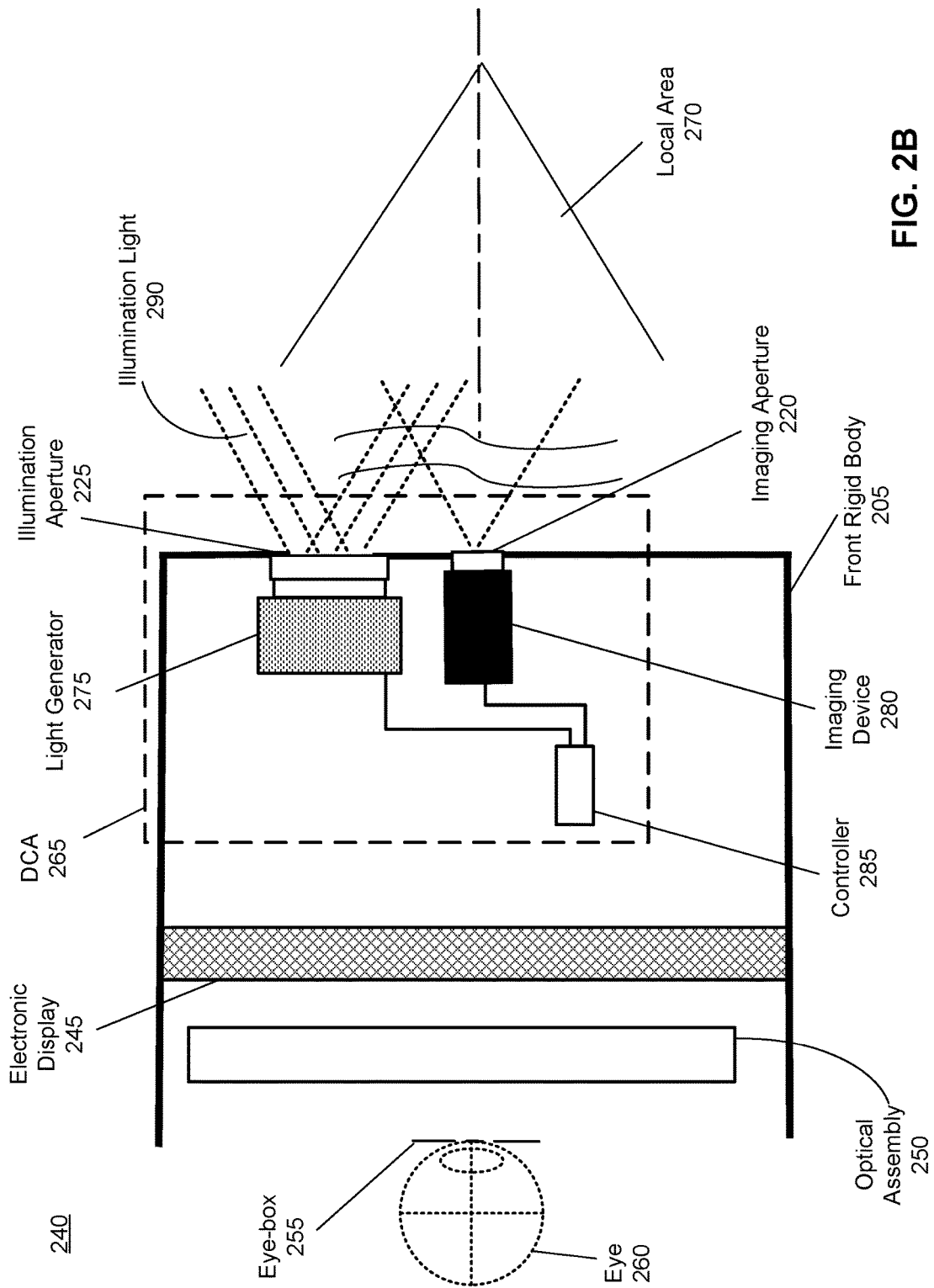
FIG. 2B is a cross section of a front rigid body of the HMD in FIG. 2A, in accordance with one or more embodiments.

FIG. 2B is a cross section 240 of the front rigid body 205 of the HMD 200 shown in FIG. 2A. As shown in FIG. 2B, the front rigid body 205 includes an electronic display 245 and an optical assembly 250 that together provide image light to an eye-box 255. The eye-box 255 is a region in space that is occupied by a user's eye 260. For purposes of illustration, FIG. 2B shows a cross section 240 associated with a single eye 260, but another optical assembly 250, separate from the optical assembly 250, provides altered image light to another eye of the user.

The electronic display 245 generates image light. In some embodiments, the electronic display 245 includes an optical element that adjusts the focus of the generated image light.

The electronic display 245 displays images to the user in accordance with data received from a console (not shown in FIG. 2B). In various embodiments, the electronic display 245 may comprise a single electronic display or multiple electronic displays (e.g., a display for each eye of a user). Examples of the electronic display 245 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 245 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings. In some embodiments, the electronic display 245 is configured to present content in two image planes in order to mitigate vergence-accommodation conflict in both users with a large range of accommodation as well as users with a more limited range of accommodation. More details about the electronic display 245 configured to provide variable accommodative ranges are disclosed in conjunction with FIGS. 6A-6B, FIGS. 7A-7B, FIG. 8, and FIG. 9.

The optical assembly 250 magnifies received light from the electronic display 245, corrects optical aberrations associated with the image light, and the corrected image light is presented to a user of the HMD 200. At least one optical element of the optical assembly 250 may be an aperture, a Fresnel lens, a refractive lens, a reflective surface, a diffractive element, a waveguide, a filter, or any other suitable optical element that affects the image light emitted from the electronic display 245. Moreover, the optical assembly 250 may include combinations of different optical elements. In some embodiments, one or more of the optical elements in the optical assembly 250 may have one or more coatings, such as anti-reflective coatings, dichroic coatings, etc. Magnification of the image light by the optical assembly 250 allows elements of the electronic display 245 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the field-of-view. In some embodiments, the optical assembly 250 is designed so its effective focal length is larger than the spacing to the electronic display 245, which magnifies the image light projected by the electronic display 245. Additionally, in some embodiments, the amount of magnification may be adjusted by adding or removing optical elements. In some embodiments, the optical assembly 250 includes a multifocal optical element (e.g., a bifocal optical element) for providing variable accommodative ranges in order to mitigate vergence-accommodation conflict. More details about the optical assembly 250 with the multifocal optical element are disclosed in conjunction with FIGS. 3A-3D, FIG. 4, and FIG. 5.

In some embodiments, the front rigid body 205 further includes a DCA 265 for determining depth information of one or more objects in a local area 270 surrounding some or all of the HMD 200. The DCA 265 includes a light generator 275, an imaging device 280, and a controller 285 that may be coupled to both the light generator 275 and the imaging device 280. The light generator 275 emits light through the illumination aperture 225. The light generator 275 illuminates the local area 270 with illumination light 290, e.g., in accordance with emission instructions generated by the controller 285. The controller 285 is configured to control, based on the emission instructions, operation of certain components of the light generator 275, e.g., to adjust an intensity and a pattern of the illumination light 290 illuminating the local area 270.

The light generator 275 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the structured light generator 275 can emit one or more light beams.

The imaging device 280 includes one or more cameras configured to capture, through the imaging aperture 220, at least a portion of the illumination light 290 reflected from the local area 270. The imaging device 280 captures one or more images of one or more objects in the local area 270 illuminated with the illumination light 290. The controller 285 coupled to the imaging device 280 is also configured to determine depth information for the one or more objects based on the captured portion of the reflected illumination light. In some embodiments, the controller 285 provides the determined depth information to a console (not shown in FIG. 2B) and/or an appropriate module of the HMD 200 (e.g., a varifocal module, not shown in FIG. 2B). The console and/or the HMD 200 may utilize the depth information to, e.g., generate content for presentation on the electronic display 245.

In some embodiments, the front rigid body 205 further comprises an eye tracking system (not shown in FIG. 2B) that determines eye tracking information for the user's eye 260. The determined eye tracking information may comprise information about an orientation of the user's eye 260 in in eye-box 255, i.e., information about an angle of an eye-gaze. In one embodiment, the user's eye 260 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 205 further comprises a varifocal module (not shown in FIG. 2B). The varifocal module may adjust focus of one or more images displayed on the electronic display 245, based on the eye tracking information. In one embodiment, the varifocal module adjusts focus of the displayed images and mitigates vergence-accommodation conflict by adjusting a focal distance of the optical assembly 250 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 285 to generate content for presentation on the electronic display 245.

Figure 3A:
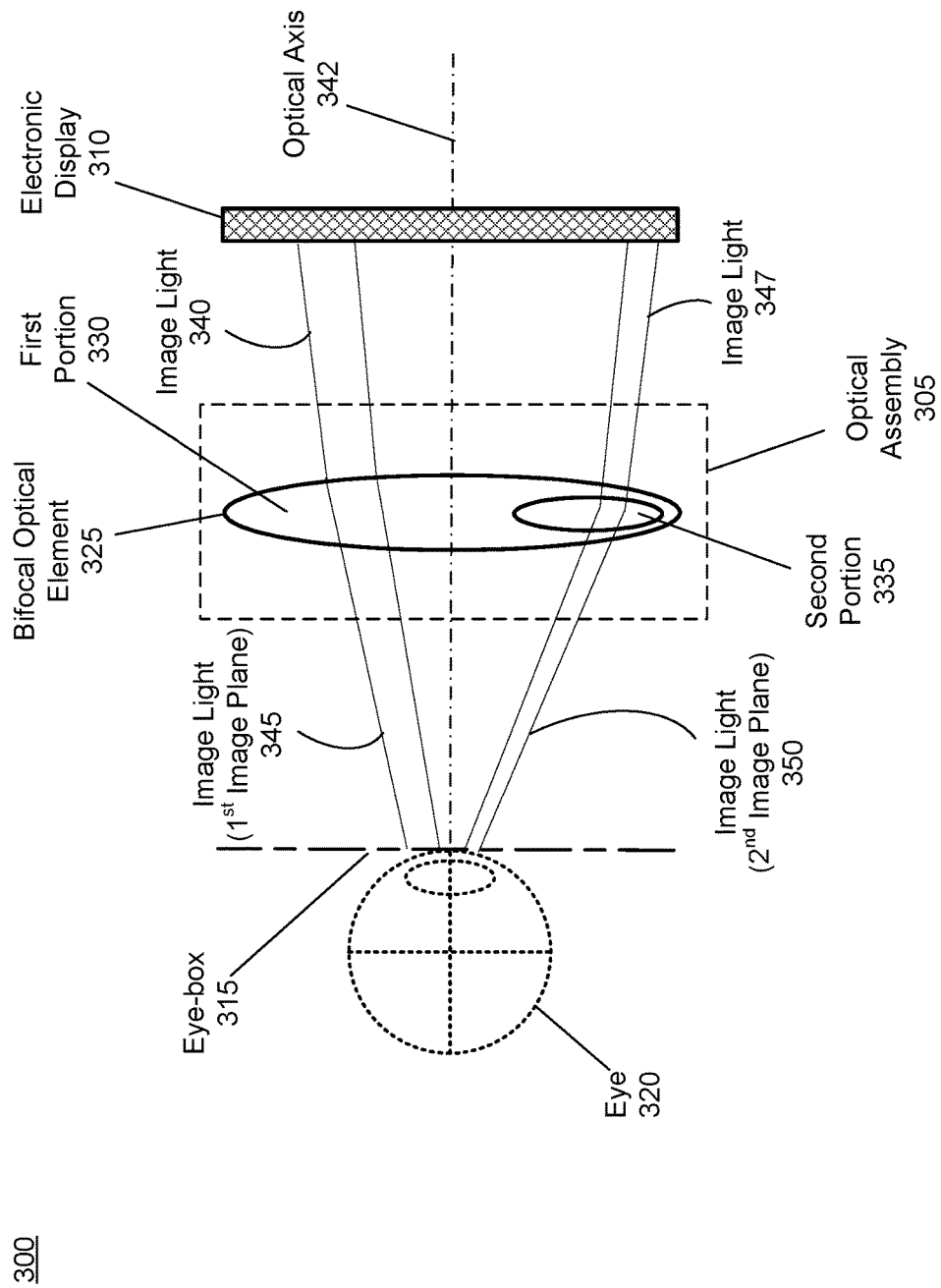
FIG. 3A is an example cross section of an optical assembly with a bifocal optical element coupled to an electronic display, which may be part of the HMD in FIG. 2A, in accordance with one or more embodiments.

FIG. 3A is an example cross section 300 of an optical assembly 305 coupled to an electronic display 310, which may be part of the HMD 200 in FIG. 2A, in accordance with one or more embodiments. The optical assembly 305 may be an embodiment of the optical assembly 250 of FIG. 2B. The optical assembly 305 may provide optical correction to image light emitted from different portions of the electronic display 310 and may direct the optically corrected image light to an eye-box 315 of a HMD corresponding to a location of a user's eye 320. In some embodiments, the optical assembly 305 includes a bifocal optical element 325 having a first optical power in a first portion 330 and a second optical power in a second portion 335. In one or more embodiments, the second portion 335 of the bifocal optical element 325 is implemented to have less optical power than the first portion 330. The bifocal optical element 325 receives and optically corrects image light emitted from different portions of the electronic display 310. The bifocal optical element 325 further directs the optically corrected image light to the eye 320 in two image planes in order to mitigate vergence-accommodation conflict in users having different accommodation ranges, as discussed in more detail below.

The electronic display 310 emits content (image light) that is received and optically corrected by the bifocal optical element 325. The electronic display 310 may be an embodiment of the electronic display 245 of FIG. 2B. The electronic display 310 may emit image light 340 from a portion of the electronic display 310 located above an optical axis 342, wherein the image light 340 may correspond to a far virtual image displayed on this portion of the electronic display 310. The first portion 330 of the bifocal optical element 325 may direct the image light 340 to at least one surface of the eye 320 as image light 345. Thus, the image light 345 provides the far virtual image to the eye 320 in a first image plane, wherein the eye 320 looking through the first portion 330 of the bifocal optical element 325 may be far focused. Note that the first image plane covers upper and central portions of a field-of-view of a HMD (e.g., the HMD 200 in FIG. 2A), which naturally corresponds to far focused vision. In some embodiments, the first portion 330 of the bifocal optical element 325 may also provide optical correction to the image light 340 to generate the optically corrected image light 345 in the first image plane.

The electronic display 310 further emits image light 347 from another portion of the electronic display 310 located below the optical axis 342, wherein the image light 347 may correspond to a near virtual image displayed on this lower portion of the electronic display 310. The image light 347 may be optically corrected by the second portion 335 of the bifocal optical element 325 and then directed to at least one surface of the eye 320 as optically corrected image light 350. Thus, the image light 350 provides the near virtual image to the eye 320 in a second image plane, wherein the eye 320 looking through the second portion 335 of the bifocal optical element 325 may be near focused. Note that the second image plane covers a lower portion of the field-of-view of the HMD, which naturally corresponds to near focused vision.

The first portion 330 of the bifocal optical element 325 may have a first optical power, whereas the second portion 335 of the bifocal optical element 325 may have a second optical power different than the first optical power. A radius of curvature of the first portion 330 of the bifocal optical element 325 may be different than that of the second portion 335 of the bifocal optical element 325, resulting into different optical powers for the first portion 330 and the second portion 335 of the bifocal optical element 325. The bifocal optical element 325 may provide optical correction to the image light 340 determined by the first optical power of the first portion 330 of the bifocal optical element 325. The bifocal optical element 325 may further provide optical correction to the image light 347 determined by the second optical power of the second portion 335 of the bifocal optical element 325.

In some embodiments, the second optical power of the second portion 335 of the bifocal optical element 325 is smaller than the first optical power of the first portion 330 of the bifocal optical element 325. Therefore, the second portion 335 of the bifocal optical element 325 provides optical correction to the image light 347 by reducing an optical power when the image light 347 propagates through the second portion 335 of the bifocal optical element 325. The second portion 335 of the bifocal optical element 325 may be thus implemented as a power reducer. In some embodiments, the second portion 335 of the bifocal optical element 325 has a negative optical power, whereas the first portion 330 of the bifocal optical element 325 has zero optical power. Content presented through the second portion 335 of the bifocal optical element 325 (i.e., power reducer) reduces an accommodative range of the image light 350 optically corrected by the second portion 335 of the bifocal optical element 325. Thus, the optically corrected image light 350 has a smaller accommodative range than the image light 345 propagated by the first portion 330 of the bifocal optical element 325.

In accordance with embodiments of the present disclosure, as discussed, the bifocal optical element 325 allows users of different accommodative ranges to view content presented on the electronic display 310 in two different image planes, i.e., the first image plane for content viewed through the first portion 330 of the bifocal optical element 325 and the second image plane for other content viewed through the second portion 335 of the bifocal optical element 325. The second portion 335 of the bifocal optical element 325 achieves this by setting an accommodative range between the first and second image plane such that a broader range of users (e.g., children and adults) are able to focus on either image plane. In this way, the bifocal optical element 325 generates two separate image planes that are at different image distances. Users having different ranges of accommodation (e.g., users of different ages) are able to focus on both of the image planes, thereby expanding a size of a user base for a HMD (e.g., the HMD 200 of FIG. 2A). Moreover, the bifocal optical element 325 is a passive device. Thus, the HMD with the optical assembly 305 having the bifocal optical element 325 does not require any moving parts to achieve different ranges of accommodation for various users.

In some embodiments, as shown in FIG. 3A, the second portion 335 of the bifocal optical element 325 (i.e., power reducer) is positioned below the optical axis 342. Thus, the user wearing the HMD 200 gazes below the optical axis 342 and through the second portion 335 of the bifocal optical element 325 to reduce an optical power of content presented on a near focal area of the electronic display 310. On the other hand, the user wearing the HMD 200 gazes above the optical axis 342 and through the first portion 330 of the bifocal optical element 325 to prevent reducing an optical power of other content presented on a far focal area of the electronic display 310. In this way, users of different accommodative ranges are allowed to view content in at least two image planes as the bifocal optical element 325 directs the far focused image light 345 in the first image plane and the near focused image light 350 in the second image plane. The first image plane covering a portion of the HMD's field-of-view below the optical axis 342 is therefore associated with the optically corrected image light 345 viewed through the first portion 330 of the bifocal optical element 325. Similarly, the second image plane covering other portions of the HMD's field-of-view is associated with the image light 350 viewed through the second portion 335 of the bifocal optical element 325.

A user of a HMD may gaze through the second portion 335 of the bifocal optical element 325 when looking at content that appear near when being rendered and displayed on the electronic display 310. In this case, the user's eye 320 is near focused. As the second portion 335 of the bifocal optical element 325 may be implemented as a power reducer having a negative optical power, a focal length $d_f$ for the eye 320 when gazing into the content that appear near on the electronic display 310 is decreased and may be equal to or approximately equal to a vergence depth $d_v$ associated with the near content. In a following time period, the user of the HMD may gaze outside the second portion 335 of the bifocal optical element 325 (i.e., outside the power reducer) and through the first portion 330 of the bifocal optical element 325 (which may not have any optical power) when looking into other content that appear far when being rendered and displayed on the electronic display 310. Because of that, a focal length $d_f$ of the eye 320 decreases and the eye 320 is far focused. Eventually, the focal length $d_f$ of the eye 320 gazing at the other content that appear far when displayed on the electronic display 310 may be equal to or approximately equal to a vergence depth $d_v$ that also increase as the other content appear far on the electronic display 310. Thus, due to the bifocal optical element 325 providing at least two image planes the accommodation process is coupled with the vergence process, which mitigates vergence-accommodation conflict in relation to the user's eye 320.

As shown in FIG. 3A, the second portion 335 of the bifocal optical element 325 may be surrounded by the first portion 335 of the bifocal optical element 325. In one embodiment, the bifocal optical element 325 is implemented as a single lens, wherein the second portion 335 of the single lens has a different optical power (e.g., lower optical power) than the first portion 330 of the single lens. The second portion 335 of the bifocal optical element 325 may be composed of a different material than the first portion 330 of the bifocal optical element 325. In some embodiments, the bifocal optical element 325 is replaceable and selected from a set of bifocal optical elements. Each bifocal optical element from the set may have a different and unique combination of the first optical power and the second optical power. The bifocal optical element 325 can be spherical, aspherical, consisting of a polynomial basis, or of a free-form.

In some embodiments, the bifocal optical element 325 comprises multiple lenses, each lens having a different optical power. For example, the first portion 330 of the bifocal optical element 325 comprises a first lens, and the second portion 335 of the bifocal optical element 325 comprises a second lens coupled to the first lens. In one embodiment (not shown in FIG. 3A), there is an air gap between the first lens and the second lens of the bifocal optical element 325. In other embodiment (not shown in FIG. 3A), the second portion 335 of the bifocal optical element 325 implemented as a lens separate from the first portion 330 can be positioned on at least a portion of a surface of the electronic display 310, e.g., on a near focal portion of the electronic display 310.

In some embodiments, the bifocal optical element 325 is implemented as a dynamic lens, e.g., a liquid crystal lens, having two operational states—an active state and an inactive state. For example, the bifocal optical element 325 implemented as a dynamic lens can be in the active state only over the second portion 335, i.e., only over a lower portion of the field-of-view. When the bifocal optical element 325 (e.g., liquid crystal lens) is in the active state, the bifocal optical element 325 may provide, via the second portion 335, a negative optical power to the lower portion of the field-of-view and to the image light 347. In this way, when being in the active state, the bifocal optical element 325 implemented as a dynamic lens directs the near focused image light 350 in the second image plane. On the other hand, when the bifocal optical element 325 (e.g., liquid crystal lens) is in the inactive state, the bifocal optical element 325 may provide no optical power, e.g., to the image light 340 associated with the upper portion of the field-of-view. In this way, when being in the inactive state, the bifocal optical element 325 implemented as a dynamic lens directs the far focused image light 345 in the first image plane. In some embodiments, a controller coupled to the bifocal optical element 325 (not shown in FIG. 3A) may be configured to control an operational state of the bifocal optical element 325 implemented as a dynamic lens, e.g., based on information about a position and orientation of the user's eye 320 in the eye-box 315 obtained from an eye tracker (not shown in FIG. 3A). For example, when the user is looking at a near virtual image in the lower portion of the field-of-view, the controller may use information about a position of the eye 320 from the eye tracker to activate the bifocal optical element 325 implemented as a dynamic lens. On the other hand, when the user is looking at a far virtual image in the upper portion of the field-of-view, the controller may use information about other position of the eye 320 from the eye tracker to deactivate the bifocal optical element 325 implemented as a dynamic lens.

Figure 3B:
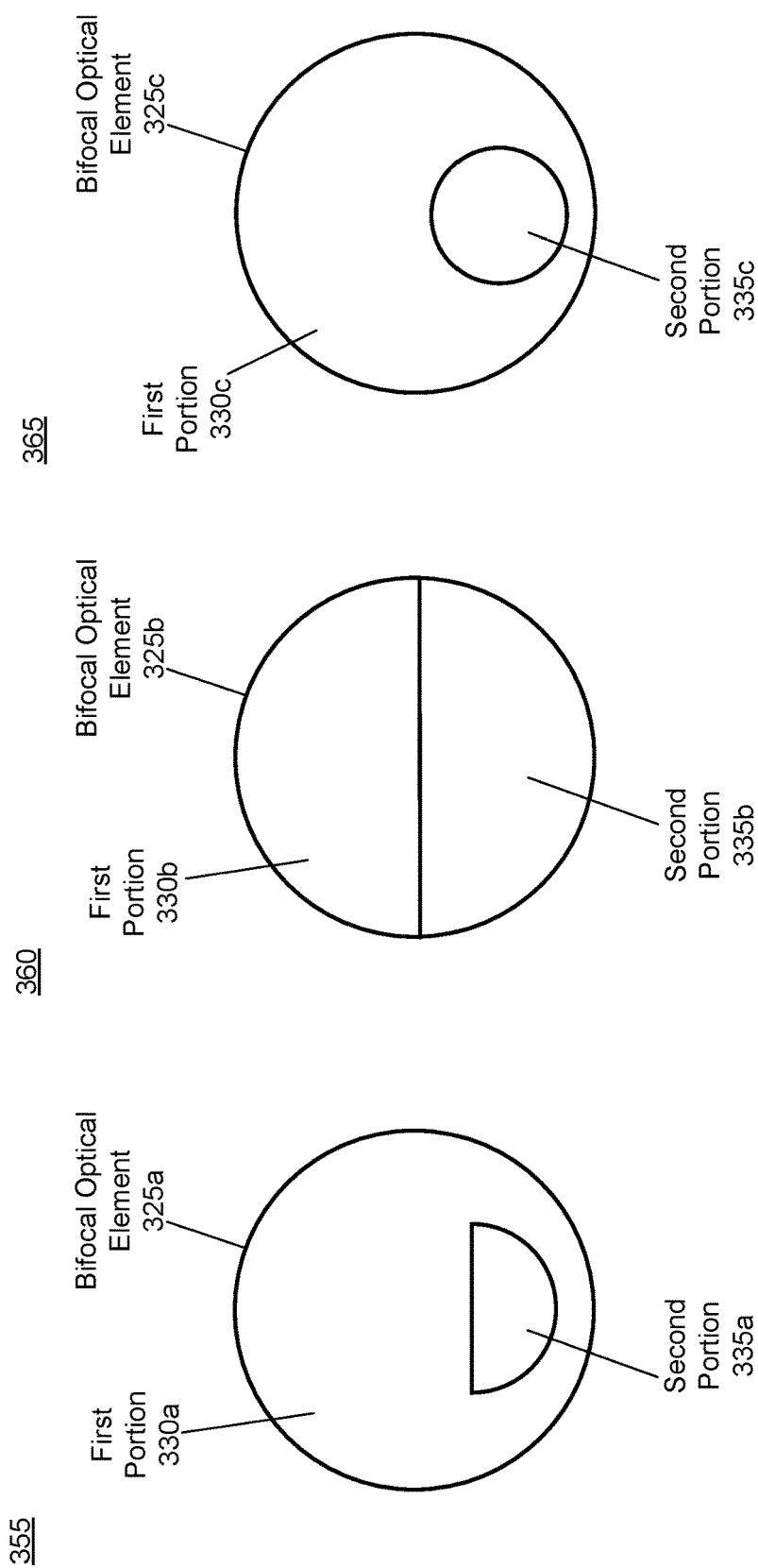
FIG. 3B shows examples of a bifocal optical element, in accordance with one or more embodiments.

FIG. 3B shows examples of bifocal optical elements 325a-c, in accordance with one or more embodiments. The bifocal optical elements 325a-c are embodiments of the bifocal optical element 325 in FIG. 3A. As shown in FIG. 3B, an aperture of the bifocal optical element 325 of FIG. 3A can be divided in several ways. In a first example 355 in FIG. 3B, the second portion 335a of the bifocal optical element 325a occupies a portion of a lower half of the bifocal optical element 325a. The first portion 330a occupies the remaining portion of the bifocal optical element 325a. A cross-section of the second portion 335a in the first example 355 represents a portion of a circle. In a second example 360 in FIG. 3B, the second portion 335b of the bifocal optical element 325b occupies the entire lower half of the bifocal optical element 325b. In this case, the entire upper half of the bifocal optical element 325b is occupied by the first portion 330b. In a third example 365 in FIG. 3B, the second portion 335c of the bifocal optical element 325c occupies a portion of a lower half of the bifocal optical element 325c, wherein a cross-section of the second portion 335c represents a full circle. The first portion 330c occupies the remaining portion of the bifocal optical element 325c.

Figure 3C:
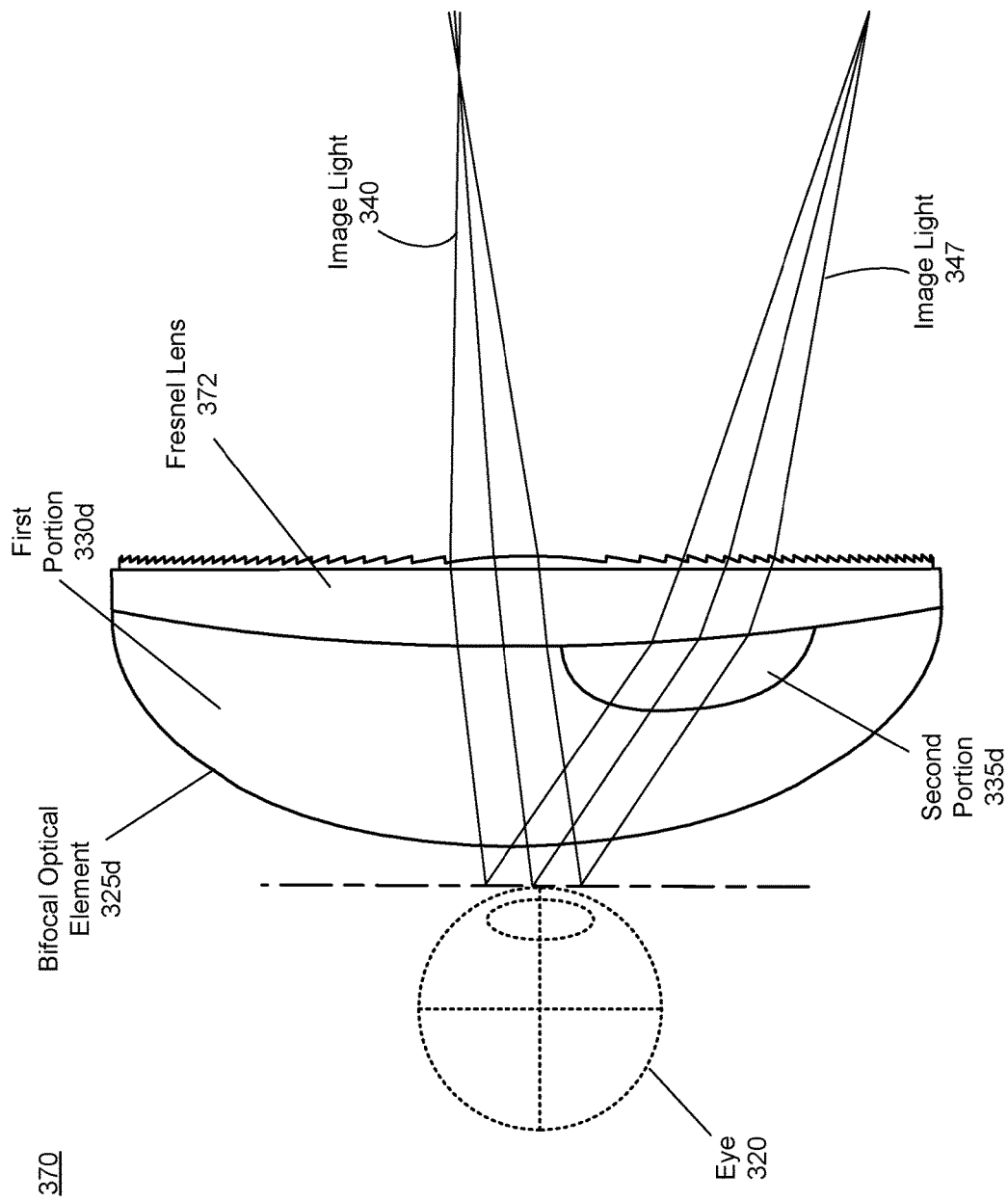
FIG. 3C shows an example cross-section of a bifocal optical element and propagation of image light through the bifocal optical element for a near-focused eye, in accordance with one or more embodiments.

FIG. 3C shows an example cross-section 370 of a bifocal optical element 325d and propagation of image light through the bifocal optical element 325d for a near-focused eye, in accordance with one or more embodiments. The bifocal optical element 325d including the first portion 330d and the second portion 335d is an embodiment of the bifocal optical element 325 in FIG. 3A. In some embodiments, as discussed, the second portion 335d is implemented as a lens having a negative optical power. The first portion 330d may occupy a remaining portion of the bifocal optical element 325d not being occupied by the second portion 335d. In some embodiments, as shown in FIG. 3C, a Fresnel lens 372 is positioned in optical series with the bifocal optical element 325d.

The image light 347 emitted from a near focal area of the electronic display 310 (not shown in FIG. 3C) is optically corrected by the second portion 335d of the bifocal optical element 325d so as a lower field-of-view of the HMD is focused to a near virtual image. As the eye 320 is near focused, the image light 340 emitted from a far focal area of the electronic display 310 propagating through the first portion 330d of the bifocal optical element 325d is not in focus at the eye 320. Thus, an upper field-of-view of the HMD is not focused to a far virtual image.

Figure 3D:
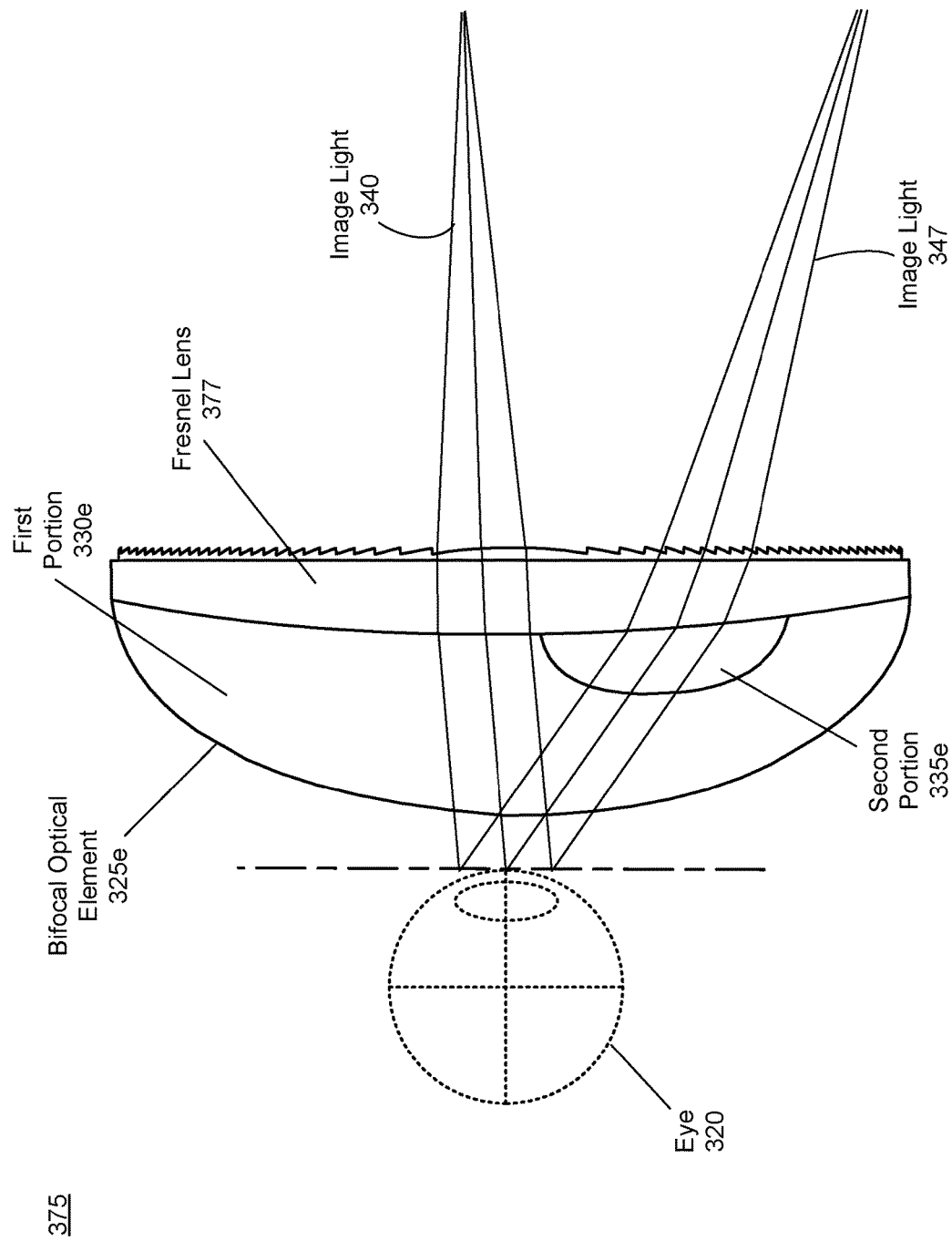
FIG. 3D shows an example cross-section of a bifocal optical element and propagation of image light through the bifocal optical element for a far-focused eye, in accordance with one or more embodiments.

FIG. 3D shows an example cross-section 375 of the bifocal optical element 325e and propagation of image light through the bifocal optical element 325e for a far-focused eye, in accordance with one or more embodiments. The bifocal optical element 325e including the first portion 330e and the second portion 335e is an embodiment of the bifocal optical element 325 in FIG. 3A. As discussed, the second portion 335e may implemented as a lens having a negative optical power. The first portion 330e may occupy a remaining portion of the bifocal optical element 325e not being occupied by the second portion 335e. In some embodiments, as shown in FIG. 3D, a Fresnel lens 377 is positioned in optical series with the bifocal optical element 325e.

The image light 340 emitted from a far focal area of the electronic display 310 (not shown in FIG. 3D) is propagated by the first portion 330e of the bifocal optical element 325e so as an upper field-of-view of the HMD is focused to a far virtual image. As the eye 320 is now far focused, the image light 347 emitted from a near focal area of the electronic display 310 (not shown in FIG. 3D) propagating through the second portion 335e of the bifocal optical element 325e is not in focus at the eye 320. Thus, a lower field-of-view of the HMD is not focused to a near virtual image.

Figure 4:
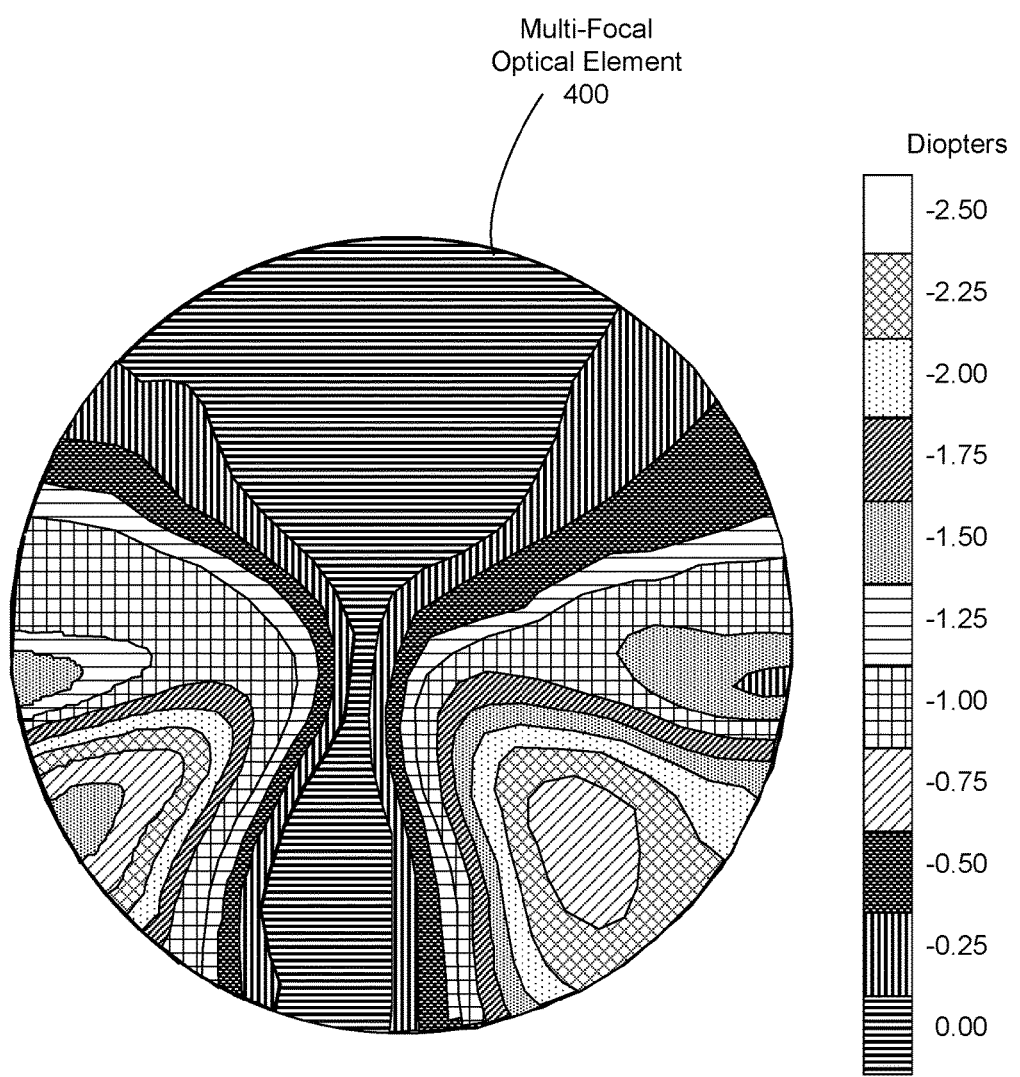
FIG. 4 is an example design of a multi-focal optical element implemented as a progressive lens, in accordance with one or more embodiments.

FIG. 4 is an example design of a multi-focal optical element 400 implemented as a progressive lens, in accordance with one or more embodiments. In some embodiments, the multi-focal optical element 400 can replace the bifocal optical element 325 as part of the optical assembly 305 of FIG. 3A. FIG. 4 shows a plurality of zones of the multi-focal optical element 400, each zone having a different optical powers. Note that a range of diopters and a layout of the zones of the multi-focal optical element 400 can be chosen in accordance with preferred optical corrections provided by the multi-focal optical element 400. In some embodiments (not shown in FIG. 4), the multi-focal optical element 400 is designed with a smoothly varying optical power across a surface of the multi-focal optical element 400.

Figure 5:
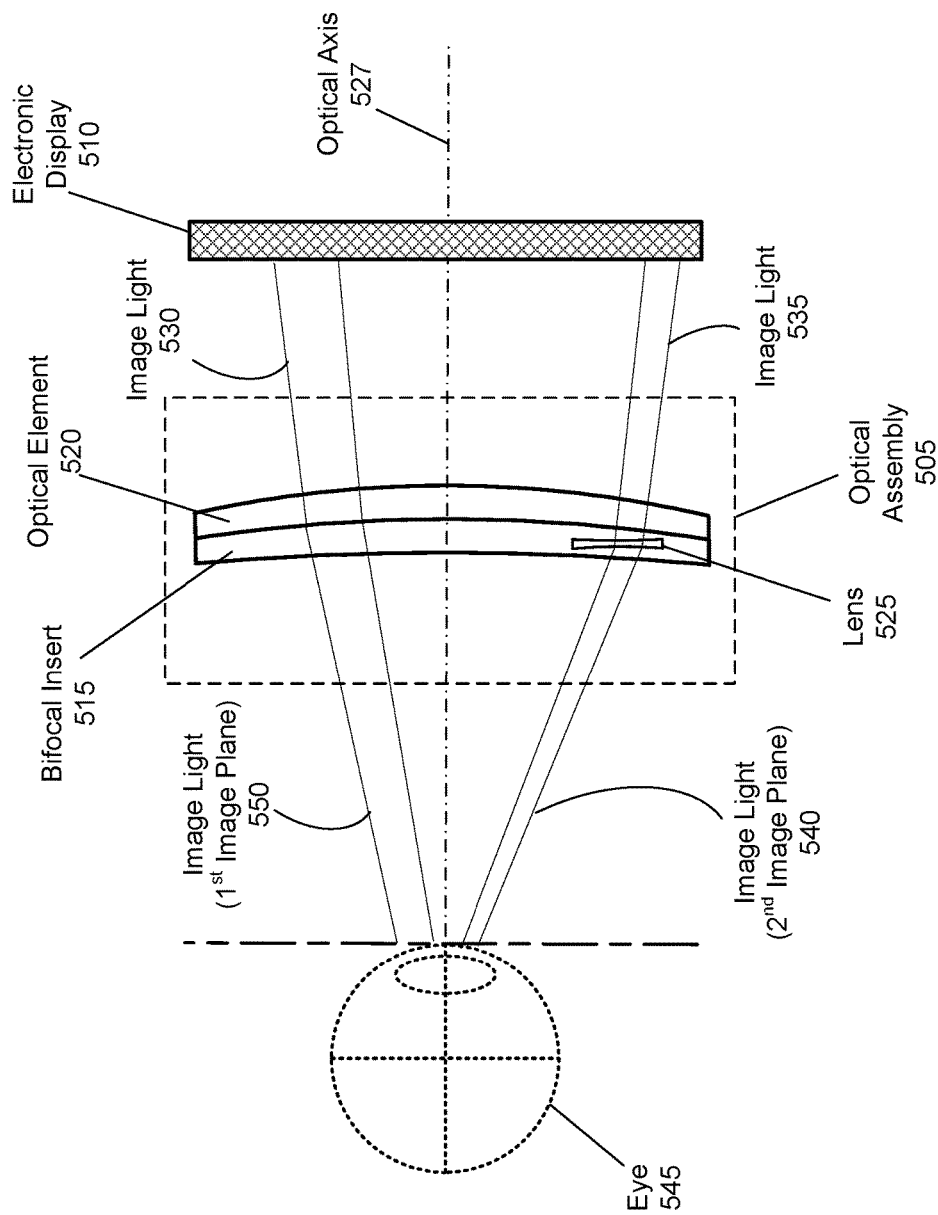
FIG. 5 is an example cross section of an optical assembly with a bifocal optical element implemented as a bifocal insert, in accordance with one or more embodiments.

FIG. 5 is an example cross section 500 of an optical assembly 505 coupled to an electronic display 510, in accordance with one or more embodiments. The optical assembly 505 may be an embodiment of the optical assembly 250 of FIG. 2B. The optical assembly 505 may include a bifocal insert 515 in optical series with at least one optical element (lens) 520. The bifocal insert 515 is an optical plate that includes a lens 525, which may be implemented as a power reducer having a negative optical power in a lower region of a field-of-view of a HMD (e.g., the HMD 200 in FIG. 2A) position below an optical axis 527. The bifocal insert 515 may have no optical power in other portions of the field-of-view of the HMD.

The electronic display 510 coupled to the optical assembly 505 may be configured to emit image light 535 associated with a far focal portion of the electronic display 510 and image light 535 associated with a near focal portion of the electronic display 510. The electronic display 510 may be an embodiment of the electronic display 245 of FIG. 2B. The lens (power reducer) 525 may provide optical correction to the image light 535 related to the near focal portion and directs optically corrected image light 540 in a near-focused image plane to a user's eye 545. Other portions of the bifocal insert 515 may be configured to direct the image light 530 related to the far focal portion as image light 550 in a far-focused image plane to the eye 550.

In some embodiments, the bifocal insert 515 can be combined with the at least one optical element 520 to achieve an appropriate optical correction and visual experience for a user. An optical power of the at least one optical element 520 may be selected based on, e.g., an optical power of the power reducer 525 and/or an optical power of the remaining portion of the bifocal insert 515. In some embodiments, the bifocal optical element 325 of FIG. 3 can be integrated into the optical assembly 505 as the bifocal insert 515. In other embodiments, the multi-focal optical element 400 of FIG. 4 implemented as a progressive lens can be integrated into the optical assembly 505 instead of the bifocal insert 515.

Figure 6A:
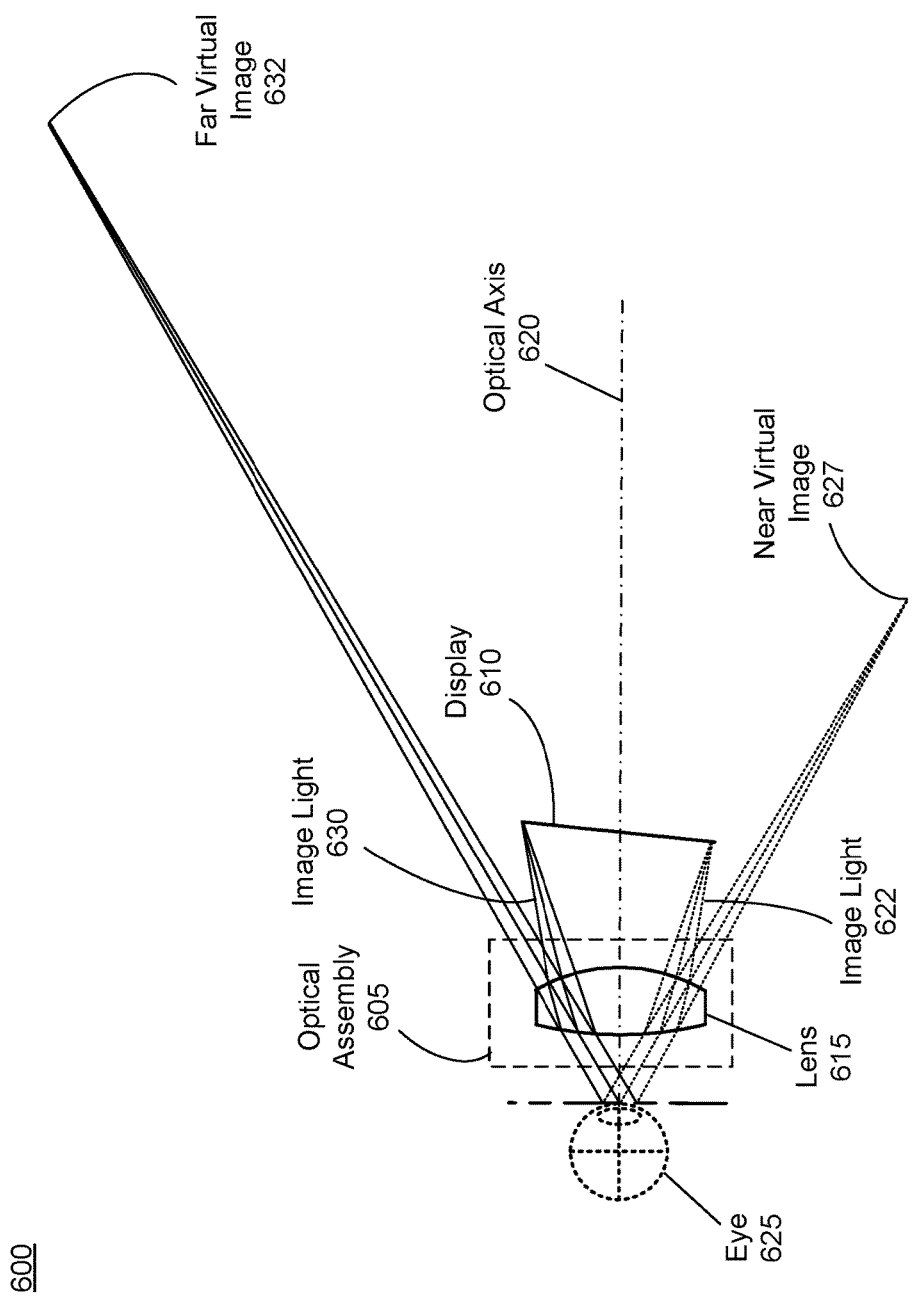
FIG. 6A is an example cross section of an optical assembly in optical series with a tilted display for achieving lower field myopia, in accordance with one or more embodiments.

FIG. 6A is an example cross section 600 of an optical assembly 605 in optical series with a tilted display 610 for achieving lower field myopia, in accordance with one or more embodiments. The optical assembly 605 in optical series with the display 610 may be part of the HMD 200 in FIG. 2A. The optical assembly 605 may include an optical element, e.g., a convex lens 615 as shown in FIG. 6A. In some embodiments, the optical assembly 605 may include other or additional optical elements (lenses). The optical assembly 605 may be an embodiment of the optical assembly 250 of the front rigid body 205 of FIG. 2B.

The display 610 can be implemented as an electronic display that is tilted relative to an optical axis 620. The display 610 may be an embodiment of the electronic display 245 of the front rigid body 205 of FIG. 2B. By tilting the display 610 relative to the optical axis 620, the display 610 in optical series with the lens 615 provides two image planes with different focuses to a user's eye 625. The display 610 can be divided into a near focal portion and a far focal portion to mitigate vergance-accommodation conflict in both users with a large range of accommodation as well as users with a more limited range of accommodation.

The display 610 emits image light 622 from a near focal portion of the display 610 that presents content in a lower field-of-view of a HMD (e.g., the HMD 200 in FIG. 2A) positioned below the optical axis 620. The near focal portion of the display 610 is located below the optical axis 620 and features locally decreased optical power due to the tilting of the display 610. The image light 622 emitted from the display 610 may be optically corrected by the lens 615 before reaching at least one surface of the eye 625. In this way, the lower field-of-view is focused to a near virtual image 627 related to content being presented in the near focal portion of the display 610. Note that humans naturally have lower field myopia, i.e., they naturally look in a lower field-of-view for near objects (e.g., objects within an arm length). The tilted display 610 in optical series with the lens 615 provides lower field myopia in artificial reality systems.

The display 610 further emits image light 630 from a far focal portion of the display 610 that presents content in an upper field-of-view of the HMD (e.g., above the optical axis 620). As discussed above, an upper field-of-view is naturally used by humans for looking into far objects. The far focal portion of the display 610 is located above the optical axis 620 and features non-modified optical power due to the tilting of the display 610. The image light 630 emitted from the display 610 may be optically corrected by the lens 615 before reaching at least one surface of the eye 625. In this way, the upper field-of-view is focused to a far virtual image 632 related to content presented in the far focal portion of the display 610.

By tilting the display 610 along the optical axis 620, the display 610 is positioned with respect to the optical axis 620 such that the image light 622 emitted by the near focal portion of the display 610 and the image light 630 emitted by the far focal portion of the display 610 appear to originate at different distances from the optical assembly 605. In this way, the optical assembly 605 generates at least a first image plane associated with the far focal portion of the display 610 and a second image plane associated with the near focal portion of the display 610. By providing multiple image planes associated with near and far focal distances to the user's eye 625, the accommodation process is coupled with the vergence process, which mitigates vergence-accommodation conflict in relation to the user's eye 625.

Figure 6B:
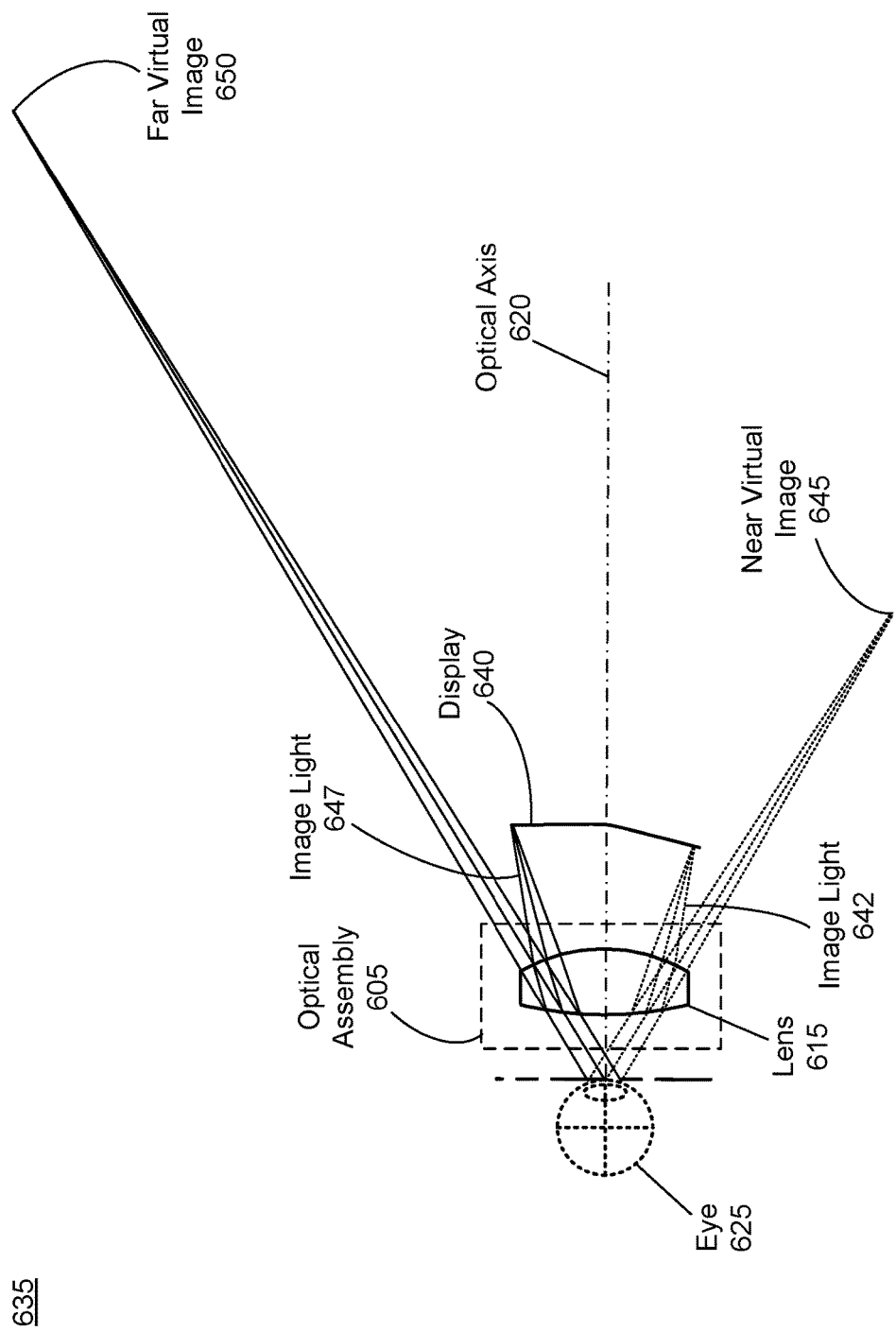
FIG. 6B is an example cross section of an optical assembly in optical series with a curved (bent) display for achieving lower field myopia, in accordance with one or more embodiments.

FIG. 6B is an example cross section 635 of the optical assembly 605 with the lens 615 in optical series with a curved (bent) display 640 for achieving lower field myopia, in accordance with one or more embodiments. The optical assembly 605 in optical series with the display 640 may be part of the HMD 200 in FIG. 2A. The display 640 can be implemented as an electronic display that is curved or bent in at least one dimension relative to the optical axis 620. By curving or bending the display 640 relative to the optical axis 620, the display 640 in optical series with the lens 615 provides two image planes with different focuses to mitigate vergance-accommodation conflict for a variety of users. The display 640 may be an embodiment of the electronic display 245 of the front rigid body 205 of FIG. 2B.

The display 640 emits image light 642 from a near focal portion of the display 640 that presents content in a lower field-of-view (e.g., below the optical axis 620). The near focal portion of the display 640 is located below the optical axis 620 and features locally decreased optical power due to the curving or bending of the display 610. The image light 642 emitted from the display 640 may be optically corrected by the lens 615 before reaching at least one surface of the eye 625. In this way, the lower field-of-view is focused to a near virtual image 645 related to content being presented in the near focal portion of the display 640. In this way, the curved or bent display 640 in optical series with the lens 615 provides lower field myopia in artificial reality systems.

The display 640 further emits image light 647 from a far focal portion of the display 640 in an upper field-of-view of the HMD (e.g., above the optical axis 620), which may be used for content that appears further away. The image light 647 emitted from the display 640 may be optically corrected by the lens 615 before reaching at least one surface of the eye 625. In this way, the upper field-of-view is focused to a far virtual image 650 related to content being presented in the far focal portion of the display 640.

By curving or bending the display 614 along the optical axis 620, the display 640 is positioned with respect to the optical axis 620 such that the image light 642 emitted by the near focal portion of the display 640 and the image light 647 emitted by the far focal portion of the display 640 appear to originate at different distances from the optical assembly 605. In this way, the optical assembly 605 generates at least a first image plane associated with the far focal portion of the display 640 and a second image plane associated with the near focal portion of the display 640. By providing multiple image planes associated with near and far focal distances to the user's eye 625, the accommodation process is coupled with the vergence process, which mitigates vergence-accommodation conflict in relation to the user's eye 625.

Figure 7A:
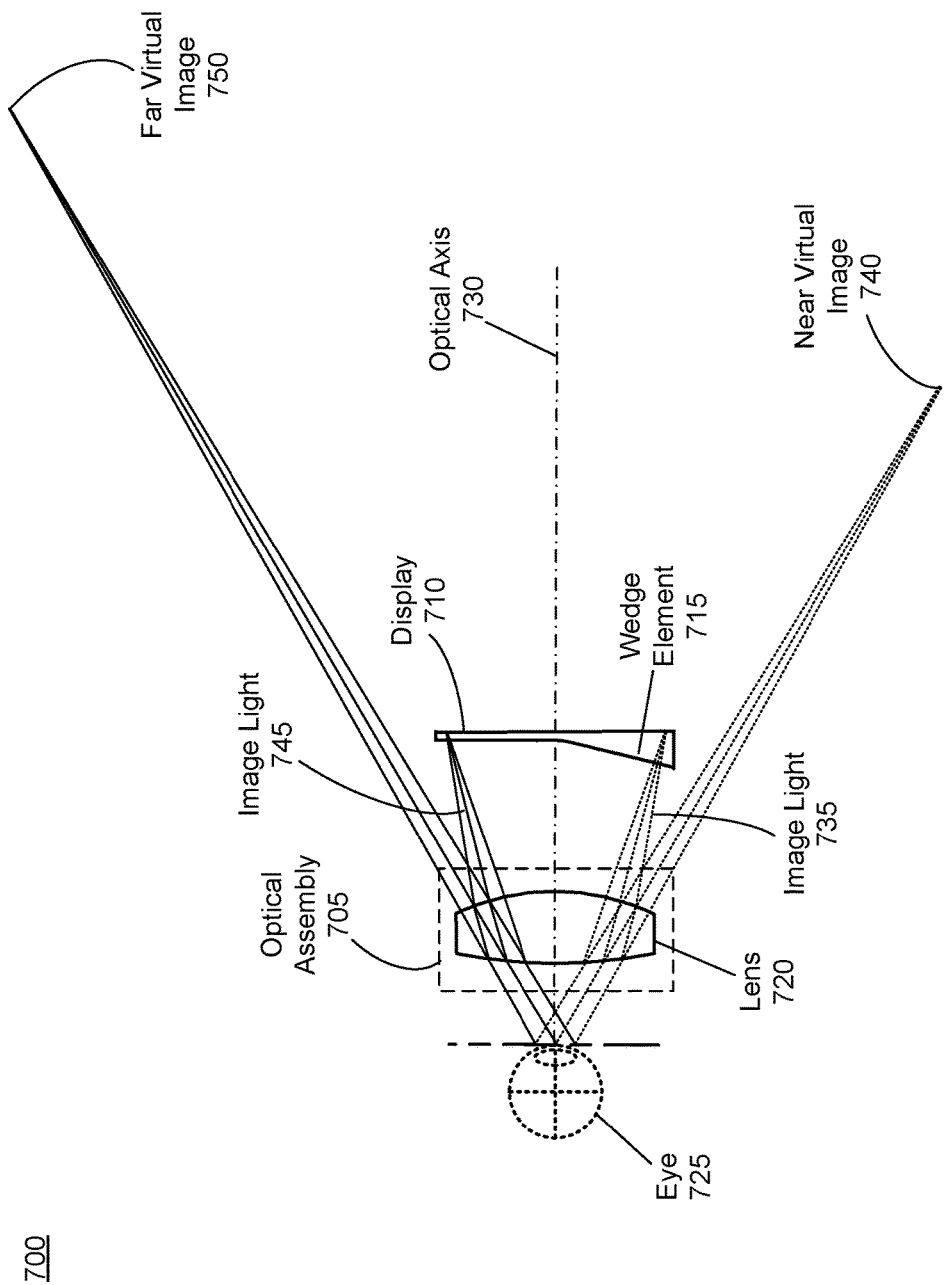
FIG. 7A is an example cross section of an optical assembly in optical series with a display having a wedge for achieving lower field myopia, in accordance with one or more embodiments.

FIG. 7A is an example cross section 700 of an optical assembly 705 in optical series with a display 710 having a wedge element 715 for achieving lower field myopia, in accordance with one or more embodiments. The optical assembly 705 in optical series with the display 710 may be part of the HMD 200 in FIG. 2A. The optical assembly 705 may include an optical element, e.g., a convex lens 720, as shown in FIG. 7A. In some embodiments, the optical assembly 705 may include other or additional optical elements (lenses). The optical assembly 705 may be an embodiment of the optical assembly 250 of the front rigid body 205 of FIG. 2B.

The display 710 may be implemented as an electronic display having the wedge element 715 coupled to a near focal portion of the display 710 corresponding to a lower-field-of-view of a HMD (e.g., the HMD 200 in FIG. 2A) positioned below an optical axis 730. The wedge element 715 may be implemented as a wedged piece of glass or plastic coupled to a lower portion of the display 710. The wedge element 715 may change an optical depth in the lower portion of the display 710 and may provide a localized shift in virtual image distance. Thus, by coupling the wedge element 715 to the lower portion of the display 710, the display 710 in optical series with the lens 720 provides two image planes with different focuses to mitigate vergance-accommodation conflict for a variety of users. The display 710 may be an embodiment of the electronic display 245 of the front rigid body 205 of FIG. 2B.

The display 710 emits image light 735 from the near focal portion of the display 710 coupled to the wedge element 715 that presents content in a lower field-of-view of the HMD. The image light 735 may be optically corrected by the lens 720 before reaching at least one surface of the eye 725. In this way, the lower field-of-view is focused to a near virtual image 740 related to content being presented in the near focal portion of the display 710. In this way, the display 710 in optical series with the lens 720 provides lower field myopia in artificial reality systems.

The display 710 further emits image light 745 from a far focal portion of the display 710 in an upper field-of-view (e.g., above the optical axis 730), which may be used for virtual content that appears further away. The image light 745 emitted from the display 710 may be optically corrected by the lens 720 before reaching at least one surface of the eye 725. In this way, the upper field-of-view is focused to a far virtual image 750 related to content being presented in the far focal portion of the display 710.

By coupling the wedge element 715 to the display 710, the display 710 is positioned with respect to the optical axis 730 such that the image light 735 emitted by the near focal portion of the display 710 and the image light 745 emitted by the far focal portion of the display 710 appear to originate at different distances from the optical assembly 705. In this way, the optical assembly 705 generates at least a first image plane associated with the far focal portion of the display 710 and a second image plane associated with the near focal portion of the display 710. The wedge element 715 coupled as a secondary element to the display 710 is configured to adjust the image light 735 emitted from the near focal portion of the display 710 located below the optical axis 730 such that the image light 735 appears at the second image plane. By providing multiple image planes associated with near and far focal distances to the user's eye 725, the accommodation process is coupled with the vergence process, which mitigates vergence-accommodation conflict in relation to the user's eye 725.

Figure 7B:
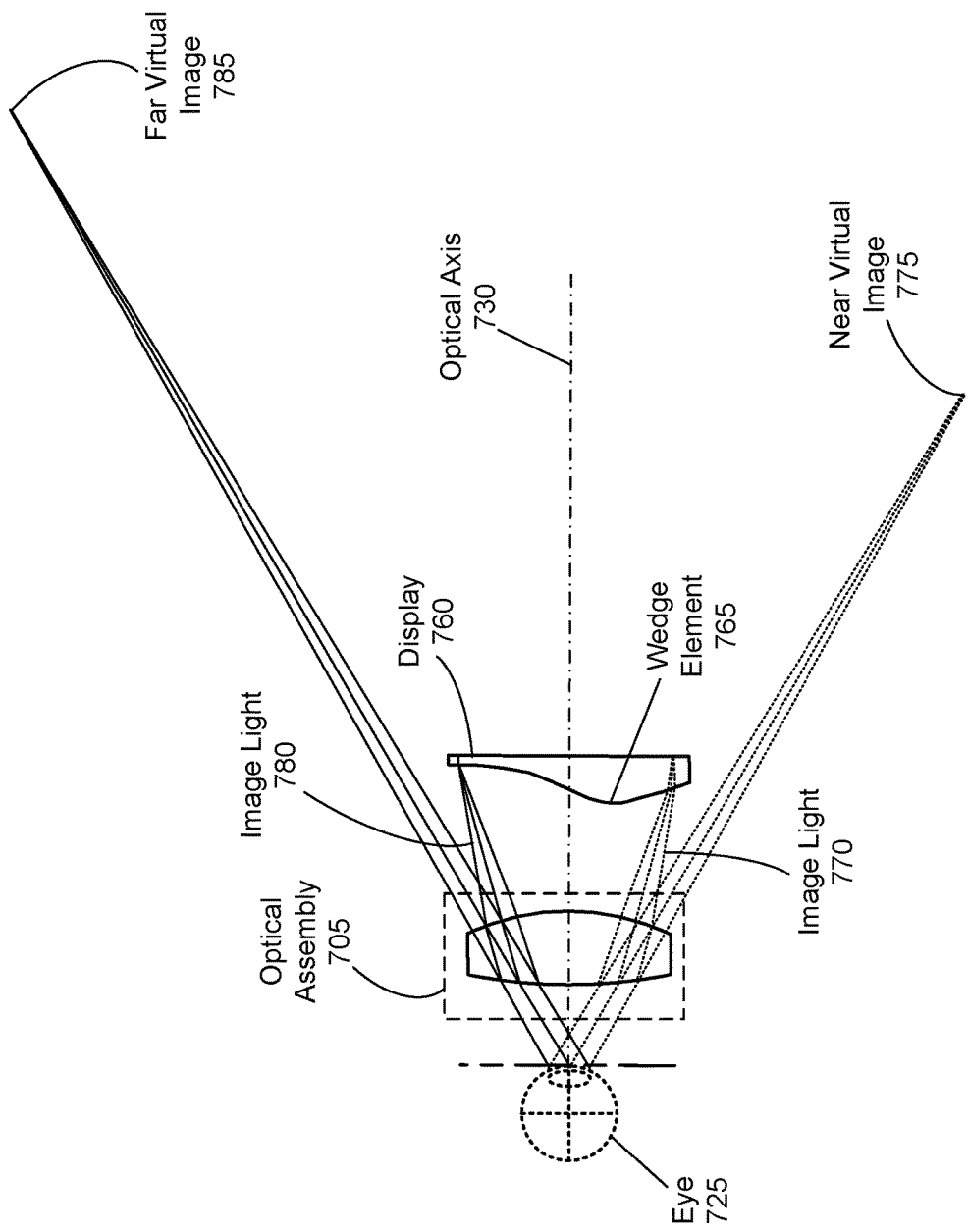
FIG. 7B is another example cross section of an optical assembly in optical series with a display having a wedge for achieving lower field myopia, in accordance with one or more embodiments.

FIG. 7B is an example cross section 755 of the optical assembly 705 in optical series with a display 760 having a wedge element 765 for achieving lower field myopia, in accordance with one or more embodiments. The optical assembly 705 in optical series with the display 760 may be part of the HMD 200 in FIG. 2A.

The display 760 can be implemented as an electronic display having the wedge 765 coupled to a near focal portion of the display 760, e.g., to a portion of the display below the optical axis 730. The display 760 may be an embodiment of the electronic display 245 of the front rigid body 205 of FIG. 2B. The wedge element 765 may be implemented as a wedged piece of glass or plastic coupled to the lower portion of the display 760. As shown in FIG. 7B, the wedge element 765 can be implemented to thin out near a very bottom of the near focal portion of the display 760. In this way, content presented in a ground region of the display 760 may not appear optically close. Similarly as for the wedge element 715 of FIG. 7A, the wedge element 765 may change an optical depth in the near focal portion of the display 760 and may provide a localized shift in virtual image distance. Thus, by coupling the wedge element 765 to the near focal portion of the display 760, the display 760 in optical series with the lens 720 provides two image planes with different focuses to mitigate vergance-accommodation conflict for a variety of users.

The display 760 emits image light 770 from the near focal portion of the display 760 coupled to the wedge element 765 that presents content in a lower field-of-view of the HMD (e.g., below the optical axis 730). The image light 770 may be optically corrected by the lens 720 before reaching at least one surface of the eye 725. In this way, the lower field-of-view is focused to a near virtual image 775 related to content being presented in the near focal portion of the display 760. Thus, the display 760 in optical series with the lens 720 provides lower field myopia in artificial reality systems.

The display 760 further emits image light 780 from a far focal portion of the display 760 in an upper field-of-view of the HMD (e.g., above the optical axis 730), which may be used for content that appears further away. The image light 780 emitted from the display 760 may be optically corrected by the lens 720 before reaching at least one surface of the eye 725. In this way, the upper field-of-view is focused to a far virtual image 785 related to content being presented in the far focal portion of the display 760.

By implementing the display 760 with the wedge element 765, the display 760 is positioned with respect to the optical axis 730 such that the image light 770 emitted by the near focal portion of the display 760 and the image light 780 emitted by the far focal portion of the display 760 appear to originate at different distances from the optical assembly 705. In this way, the optical assembly 705 generates at least a first image plane associated with the far focal portion of the display 760 and a second image plane associated with the near focal portion of the display 760. The wedge element 765 coupled as a secondary element to the display 760 is configured to adjust the image light 770 emitted from the near focal portion of the display 760 located below the optical axis 730 such that the image light 770 appears at the second image plane. Note that a location of the second image plane is based in part on a thickness of the wedge element 756. By providing multiple image planes associated with near and far focal distances to the user's eye 725, the accommodation process is coupled with the vergence process, which mitigates vergence-accommodation conflict in relation to the user's eye 725.

Figure 8:
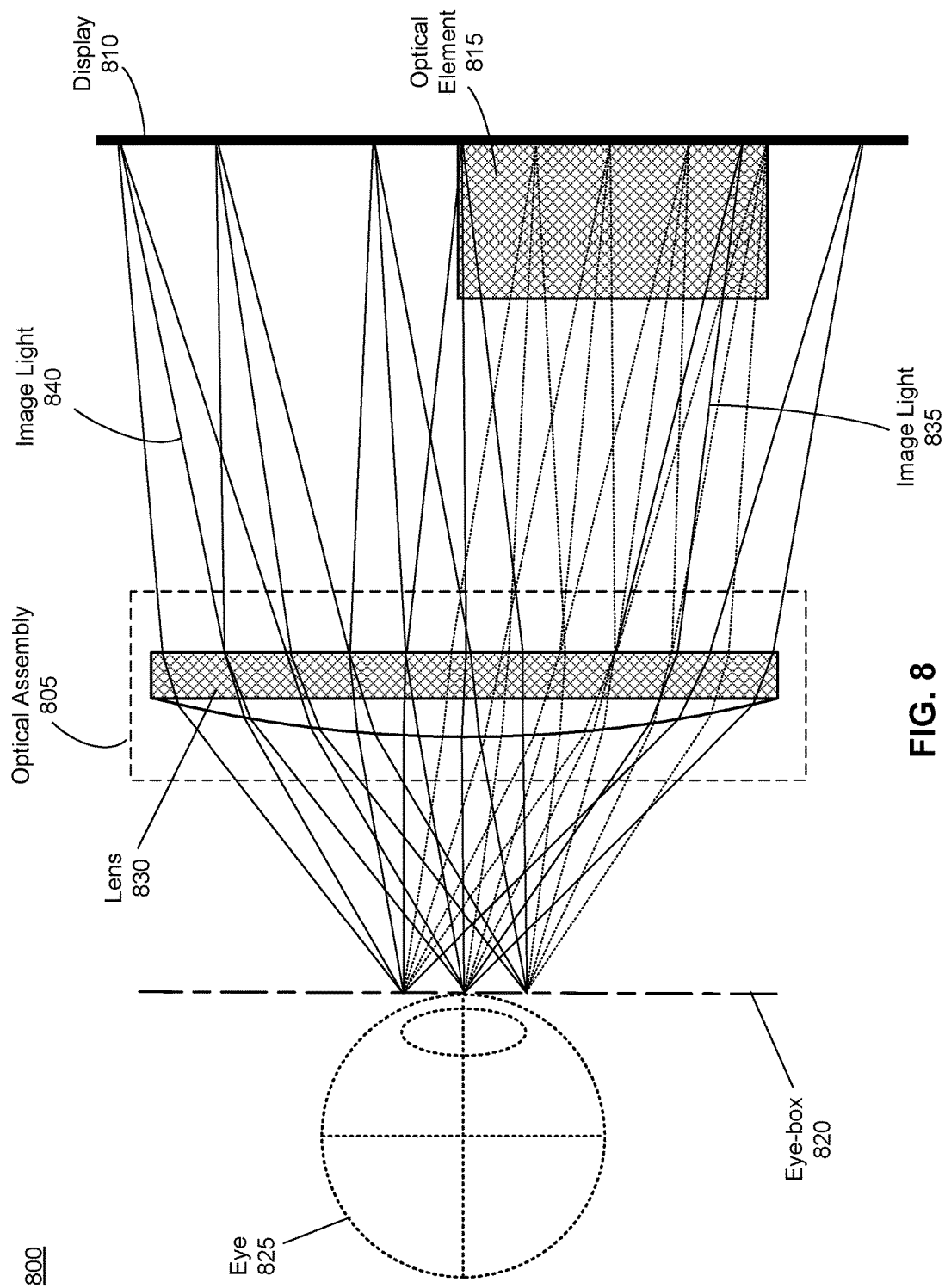
FIG. 8 is an example cross section of an optical assembly in optical series with a display having a transparent optical element for achieving lower field myopia, in accordance with one or more embodiments.

FIG. 8 is an example cross section 800 of an optical assembly 805 in optical series with a display 810 coupled to an optical element 815 for achieving lower field myopia, in accordance with one or more embodiments. The optical assembly 805 in optical series with the display 810 may be part of the HMD 200 in FIG. 2A. The optical assembly may provide optical correction to image light emitted from different portions of the display 810, and may direct the optically corrected image light to an eye-box 820 where a user's eye 825 is located. The optical assembly 805 may include a lens 830 for optical correction of the image light. In some embodiments, the optical assembly 805 may include other or additional optical elements (lenses). The optical assembly 805 may be an embodiment of the optical assembly 250 of the front rigid body 205 of FIG. 2B.

The display 810 can be implemented as an electronic display. The display 810 may be an embodiment of the electronic display 245 of the front rigid body 205 of FIG. 2B. A near focal portion of the display 810 corresponding to a lower field-of-view of a HMD (e.g., the HMD 200 in FIG. 2A) may be coupled to the optical element 815. In some embodiments, the optical element 815 is implemented as a rectangular prism. The rectangular prism includes an output surface that is substantially flat. An increase of thickness in the near focal portion of the display 810 coupled to the optical element 815 may change an optical depth in this portion of the display 810, and may provide a localized shift in virtual image distance. In this way, the portion of the display 810 coupled to the optical element 815 provides a better focus for a near virtual object. By coupling the optical element 815 to the near focal portion of the display 810, the display 810 in optical series with the lens 830 provides two image planes with different focuses to mitigate vergance-accommodation conflict for a variety of users.

The display 810 emits image light 835 from the near focal portion of the display 810 coupled to optical element 815, wherein the image light 835 may be related to content being presented in a lower field-of-view of the HMD. The image light 835 may be optically corrected by the lens 820 before reaching at least one surface of the eye 825. In this way, the lower field-of-view is focused to a near virtual image related to content being presented in the near focal portion of the display 810. Therefore, the display 810 in optical series with the lens 820 provides lower field myopia in artificial reality systems.

The display 810 further emits image light 840 from a far focal portion of the display 810 related to an upper field-of-view of the HMD, which may be used for presenting virtual content that appear further away. The image light 840 emitted from the display 810 may be optically corrected by the lens 820 before reaching at least one surface of the eye 825. In this way, the upper field-of-view is focused to a far virtual image related to content being presented in the far focal portion of the display 810.

By coupling the optical element 815 to the display 810, the display 810 is positioned with respect to an optical axis such that the image light 835 emitted by the near focal portion of the display 810 and the image light 840 emitted by the far focal portion of the display 810 appear to originate at different distances from the optical assembly 805. In this way, the optical assembly 805 generates at least a first image plane associated with the far focal portion of the display 810 and a second image plane associated with the near focal portion of the display 810. The optical element 815 coupled as a secondary element to the display 810 is configured to adjust the image light 835 emitted from the near focal portion of the display 810 located below the optical axis such that the image light appears at the second image plane. By providing multiple image planes associated with near and far focal distances to the user's eye 825, the accommodation process is coupled with the vergence process, which mitigates vergence-accommodation conflict in relation to the user's eye 825.

Figure 9:
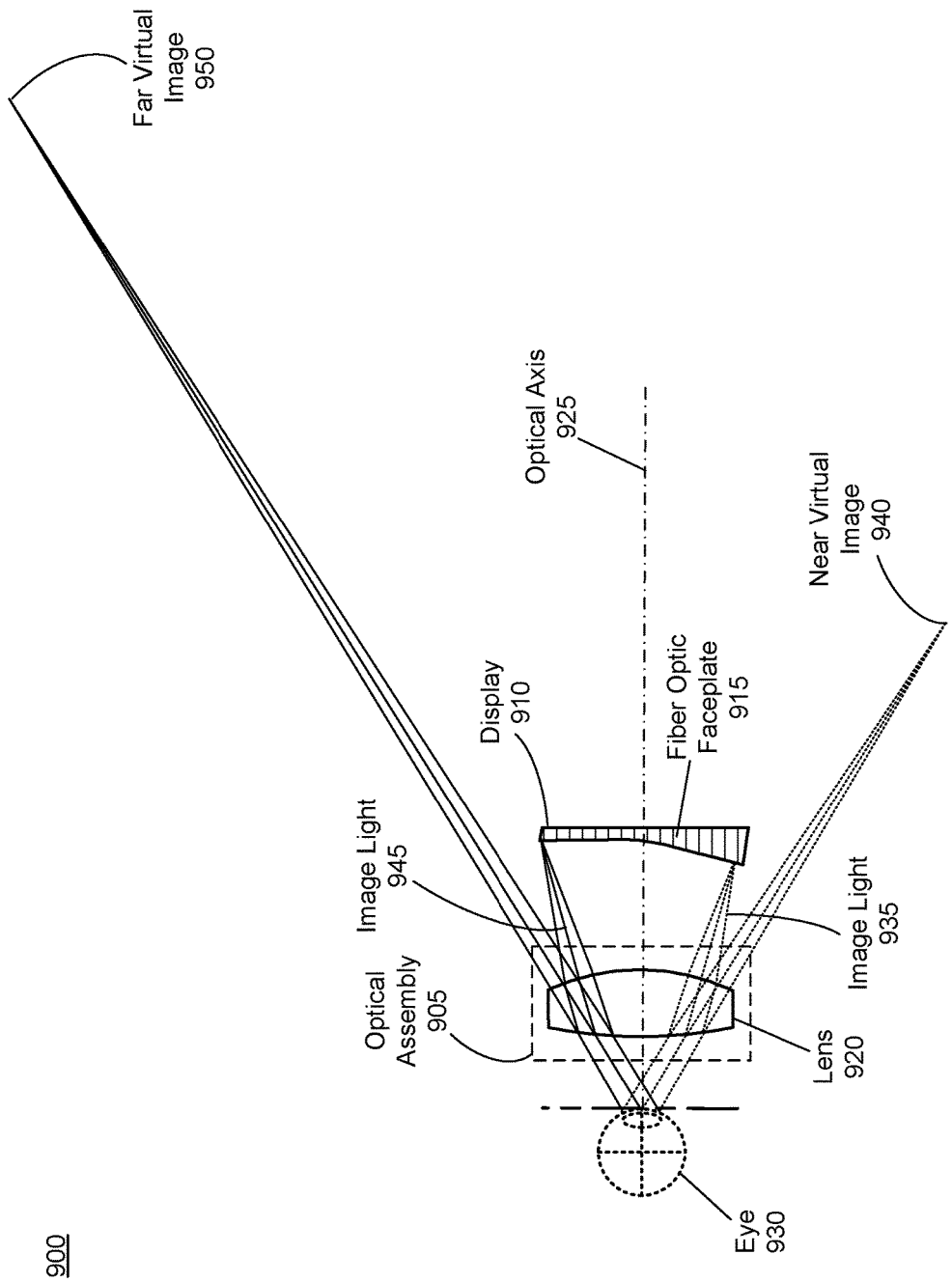
FIG. 9 is an example cross section of an optical assembly in optical series with a display having a fiber optic faceplate for achieving lower field myopia, in accordance with one or more embodiments.

FIG. 9 is an example cross section 900 of an optical assembly 905 in optical series with a display 910 having a wedged or curved fiber optic faceplate 915 for achieving lower field myopia, in accordance with one or more embodiments. The optical assembly 905 in optical series with the display 910 may be part of the HMD 200 in FIG. 2A. The optical assembly 905 may include an optical element, e.g., a convex lens 920, as shown in FIG. 9. In some embodiments, the optical assembly 905 may include other or additional optical elements (lenses). The optical assembly 905 may be an embodiment of the optical assembly 250 of the front rigid body 205 of FIG. 2B.

The display 910 can be implemented as an electronic display having the wedged or curved fiber optic faceplate 915 bonded to at least a portion of the display 910, e.g., a near focal portion of the display 910 positioned below an optical axis 925. The fiber optic faceplate 915 may be implemented as a bundle of fibers that are bonded together such that light enters one side of the bundle and exits at the other. The fiber optic faceplate 915 may include an input surface and an output surface (not shown in FIG. 9), the input surface receives image light emitted from the near focal portion of the display 910 and the output surface emits the received image light as the image light 935. Note that a thickness of a portion of the fiber optic faceplate 915 that receives the image light from the near focal portion of the display 910 is greater than a thickness of a portion of the fiber optic faceplate 915 that receives image light from a far focal portion of the display positioned above the optical axis 925. In some embodiments, the fiber optic faceplate 915 may be implemented to be of any suitable shape.

Similar as curving or bending a display shown in FIGS. 6A-6B, the fiber optic faceplate 915 may change an optical depth in a portion of the display 910 bonded to the fiber optic faceplate 915 providing a localized shift in virtual image distance. By coupling the fiber optic faceplate 915 on at least a portion of the display 910, the display 910 in optical series with the lens 920 provides two image planes with different focuses to mitigate vergance-accommodation conflict for a variety of users. In some embodiments, a near focal portion of the display 910 related to a lower area of a field-of-view of a HMD (e.g., the HMD 200 in FIG. 2A) may be implemented having an increased thickness to provide a localized shift in virtual image distance and a better focus for near objects. The display 910 may be an embodiment of the electronic display 245 of the front rigid body 205 of FIG. 2B.

The display 910 emits image light 935 from a near focal portion of the display 910 bonded to the fiber optic faceplate 915 and positioned below the optical axis 925 to present content in a lower field-of-view of the HMD (e.g., below the optical axis 925). In some embodiments, as discussed, the near focal portion of the display 910 may have an increased thickness. The image light 935 may be optically corrected by the lens 920 before reaching at least one surface of the eye 930. In this way, the lower field-of-view is focused to a near virtual image 940 related to content being presented in the near focal portion of the display 910. Thus, the display 910 in optical series with the lens 920 provides lower field myopia in artificial reality systems.

The display 910 having the fiber optic faceplate 915 further emits image light 945 from a far focal portion of the display 910 in an upper field-of-view of the HMD (e.g., above the optical axis 925), which may be used for presenting virtual content that appear further away. The image light 945 emitted from the display 910 may be optically corrected by the lens 920 before reaching at least one surface of the eye 930. In this way, the upper field-of-view is focused to a far virtual image 750 related to content being presented in the far focal portion of the display 910.

By implementing the display 910 with the fiber optic faceplate 915, the display 910 is positioned with respect to the optical axis 925 such that the image light 935 emitted by the near focal portion of the display 910 and the image light 945 emitted by the far focal portion of the display 910 appear to originate at different distances from the optical assembly 905. In this way, the optical assembly 905 generates at least a first image plane associated with the far focal portion of the display 910 and a second image plane associated with the near focal portion of the display 910. The fiber optic faceplate 915 coupled as a secondary element to the display 910 is configured to adjust the image light 935 emitted from the near focal portion of the display 910 located below the optical axis 925 such that the image light 935 appears at the second image plane. A location of the second image plane may be based in part on a surface profile of the output surface of the fiber optic faceplate 915. A location of the first image plane may be also based in part on the surface profile of the output surface of the fiber optic faceplate 915. By providing multiple image planes associated with near and far focal distances to the user's eye 930, the accommodation process is coupled with the vergence process, which mitigates vergence-accommodation conflict in relation to the user's eye 930.

System Environment

Figure 10:
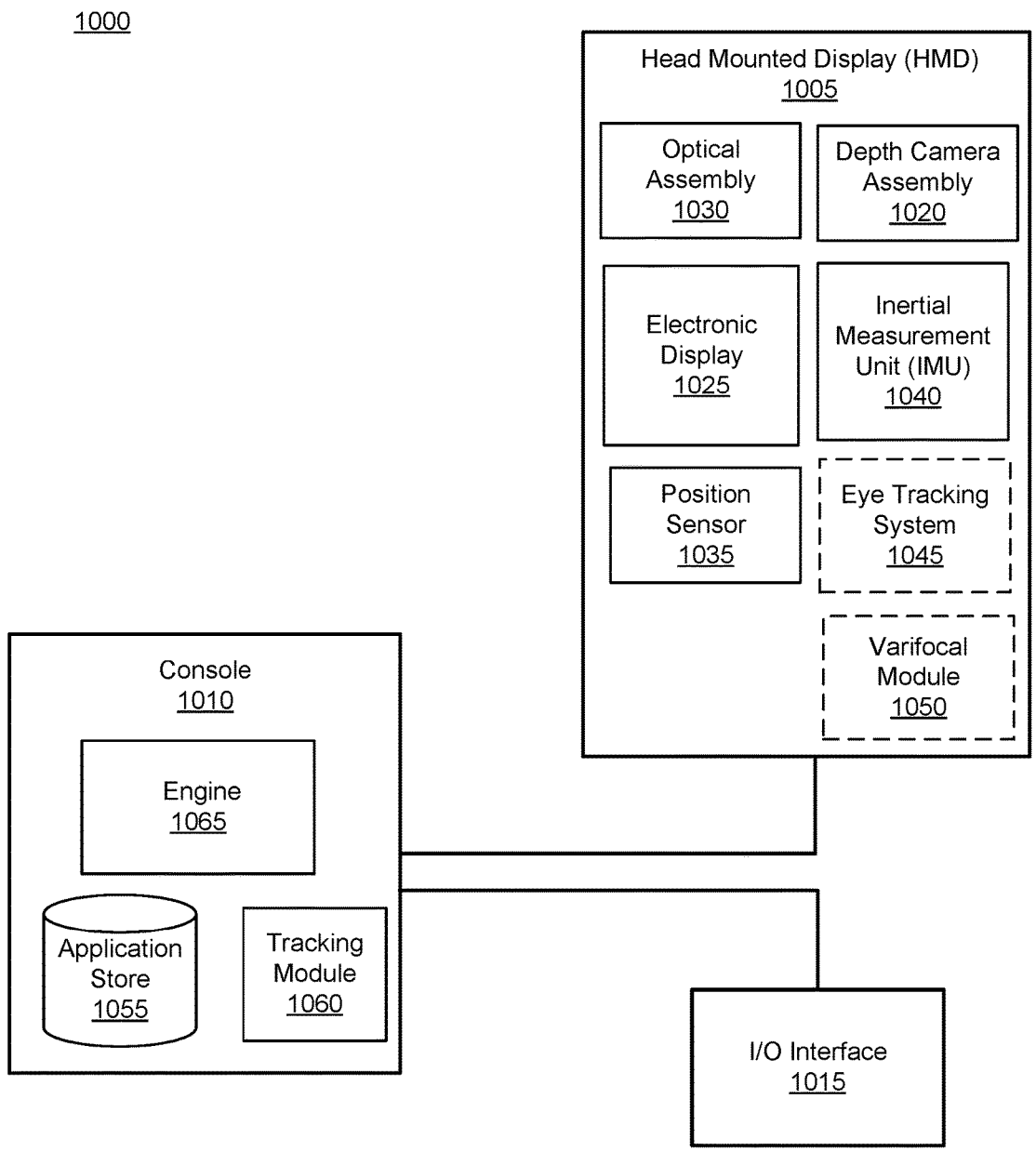
FIG. 10 is a block diagram of a HMD system in which a console operates, in accordance with one or more embodiments.

FIG. 10 is a block diagram of one embodiment of a HMD system 1000 in which a console 1010 operates. The HMD system 1000 may operate in an artificial reality system. The HMD system 1000 shown by FIG. 10 comprises a HMD 1005 and an input/output (I/O) interface 1015 that is coupled to the console 1010. While FIG. 10 shows an example HMD system 1000 including one HMD 1005 and on I/O interface 1015, in other embodiments any number of these components may be included in the HMD system 1000. For example, there may be multiple HMDs 1005 each having an associated I/O interface 1015, with each HMD 1005 and I/O interface 1015 communicating with the console 1010. In alternative configurations, different and/or additional components may be included in the HMD system 1000. Additionally, functionality described in conjunction with one or more of the components shown in FIG. 10 may be distributed among the components in a different manner than described in conjunction with FIG. 10 in some embodiments. For example, some or all of the functionality of the console 1010 is provided by the HMD 1005.

The HMD 1005 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 1005, the console 1010, or both, and presents audio data based on the audio information. The HMD 1005 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 1005 may be the HMD 200 described above in conjunction with FIG. 2.

The HMD 1005 includes a DCA 1020, an electronic display 1025, an optical assembly 1030, one or more position sensors 1035, an IMU 1040, an optional eye tracking system 1045, and an optional varifocal module 1050. Some embodiments of the HMD 1005 have different components than those described in conjunction with FIG. 10. Additionally, the functionality provided by various components described in conjunction with FIG. 10 may be differently distributed among the components of the HMD 1005 in other embodiments.

The DCA 1020 captures data describing depth information of a local area surrounding some or all of the HMD 1005. The DCA 1020 can compute the depth information using the data (e.g., based on a captured portion of a structured light pattern), or the DCA 1020 can send this information to another device such as the console 1010 that can determine the depth information using the data from the DCA 1020. The DCA 1020 may be an embodiment of the DCA 340 in FIG. 3.

The electronic display 1025 displays two-dimensional or three-dimensional images to the user in accordance with data received from the console 1010. In various embodiments, the electronic display 1025 comprises a single electronic display or multiple electronic displays (e.g., a display for each eye of a user). Examples of the electronic display 1025 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

In some embodiments, the electronic display 1025 is configured to present content in two image planes. The electronic display electronic display 1025 can be implemented to have a near and far focal portion to mitigate vergence-accommodation conflict in both users with a large range of accommodation as well as users with a more limited range of accommodation. The near focal portion is generally positioned in a lower portion of a field-of-view of the HMD 1005. In one embodiment, the electronic display 1025 provides two image planes by tilting (or bending) the electronic display 1025 with respect to the optical assembly 1030. In other embodiment, the electronic display 1025 provides two image planes by bending the electronic display 1025 with respect to the optical assembly 1030. In yet other embodiments, a fiber taper or a wedge element (both of which may be shaped) that is coupled to the electronic display 1025 may be used to provide a localized shift in virtual image distance. In some embodiments, the electronic display 1025 may represent the electronic display 245 in FIG. 2B, the electronic display 310 of FIG. 3A, the display 610 of FIG. 6A, the display 640 of FIG. 6B, the display 710 of FIG. 7A, the display 760 of FIG. 7B, the display 810 of FIG. 8, and/or the display 910 of FIG. 9.

The optical assembly 1030 magnifies image light received from the electronic display 1025, corrects optical errors associated with the image light, and presents the corrected image light to a user of the HMD 1005. The optical assembly 1030 includes a plurality of optical elements. Example optical elements included in the optical assembly 1030 include: an aperture, a Fresnel lens, a convex lens, a concave lens, a filter, a reflecting surface, or any other suitable optical element that affects image light. Moreover, the optical assembly 1030 may include combinations of different optical elements. In some embodiments, one or more of the optical elements in the optical assembly 1030 may have one or more coatings, such as partially reflective or anti-reflective coatings.

Magnification and focusing of the image light by the optical assembly 1030 allows the electronic display 1025 to be physically smaller, weigh less and consume less power than larger displays. Additionally, magnification may increase the field-of-view of the content presented by the electronic display 1025. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 1030 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 1025 for display is pre-distorted, and the optical assembly 1030 corrects the distortion when it receives image light from the electronic display 1025 generated based on the content.

In accordance with embodiments of the present disclosure, the optical assembly 1030 includes a bifocal optical element that has a specific optical power except for a portion of the bifocal optical element that is formed to have less optical power (a power reducer). Content presented through the power reducer allow users of different accommodative ranges to view content in at least a first image plane and a second image plane, i.e., an image plane for content not viewed through the power reducer and an image plane for other content viewed through the power reducer. The power reducer sets an accommodative range between the first and second image plane such that a broader range of users are able to focus on either image plane. The bifocal optical element of the optical assembly 1030 generates two separate image planes that are at different image distances. Users having different ranges of accommodation are able to focus on both of the image planes, thereby expanding a size of a user base for the HMD system 1000. Additionally, the bifocal optical element of the optical assembly 1030 may also mitigate vergence-accommodation conflict. In some embodiments, the optical assembly 1030 having the bifocal optical element may represent the optical assembly 250 in FIG. 2B and/or the optical assembly 305 of FIG. 3A.

The IMU 1040 is an electronic device that generates data indicating a position of the HMD 1005 based on measurement signals received from one or more of the position sensors 1035 and from depth information received from the DCA 1020. A position sensor 1035 generates one or more measurement signals in response to motion of the HMD 1005. Examples of position sensors 1035 include: one or more accelerometers, one or more gyroscopes, one or more magnetometers, another suitable type of sensor that detects motion, a type of sensor used for error correction of the IMU 1040, or some combination thereof. The position sensors 1035 may be located external to the IMU 1040, internal to the IMU 1040, or some combination thereof.

Based on the one or more measurement signals from one or more position sensors 1035, the IMU 1040 generates data indicating an estimated current position of the HMD 1005 relative to an initial position of the HMD 1005. For example, the position sensors 1035 include multiple accelerometers to measure translational motion (forward/back, up/down, left/right) and multiple gyroscopes to measure rotational motion (e.g., pitch, yaw, roll). In some embodiments, the position sensors 1035 may represent the position sensors 235 in FIG. 2. In some embodiments, the IMU 1040 rapidly samples the measurement signals and calculates the estimated current position of the HMD 1005 from the sampled data. For example, the IMU 1040 integrates the measurement signals received from the accelerometers over time to estimate a velocity vector and integrates the velocity vector over time to determine an estimated current position of a reference point on the HMD 1005. Alternatively, the IMU 1040 provides the sampled measurement signals to the console 1010, which interprets the data to reduce error. The reference point is a point that may be used to describe the position of the HMD 1005. The reference point may generally be defined as a point in space or a position related to the HMD's 1005 orientation and position.

The IMU 1040 receives one or more parameters from the console 1010. The one or more parameters are used to maintain tracking of the HMD 1005. Based on a received parameter, the IMU 1040 may adjust one or more IMU parameters (e.g., sample rate). In some embodiments, certain parameters cause the IMU 1040 to update an initial position of the reference point so it corresponds to a next position of the reference point. Updating the initial position of the reference point as the next calibrated position of the reference point helps reduce accumulated error associated with the current position estimated the IMU 1040. The accumulated error, also referred to as drift error, causes the estimated position of the reference point to "drift" away from the actual position of the reference point over time. In some embodiments of the HMD 1005, the IMU 1040 may be a dedicated hardware component. In other embodiments, the IMU 1040 may be a software component implemented in one or more processors. In some embodiments, the IMU 1040 may represent the IMU 230 in FIG. 2.

In some embodiments, the eye tracking system 1045 is integrated into the HMD 1005. The eye tracking system 1045 determines eye tracking information associated with an eye of a user wearing the HMD 1005. The eye tracking information determined by the eye tracking system 1045 may comprise information about an orientation of the user's eye, i.e., information about an angle of an eye-gaze. In some embodiments, the eye tracking system 1045 is integrated into the optical assembly 1030. An embodiment of the eye-tracking system 1045 may comprise an illumination source and an imaging device (camera).

In some embodiments, the varifocal module 1050 is further integrated into the HMD 1005. The varifocal module 1050 may be coupled to the eye tracking system 1045 to obtain eye tracking information determined by the eye tracking system 1045. The varifocal module 1050 may be configured to adjust focus of one or more images displayed on the electronic display 1025, based on the determined eye tracking information obtained from the eye tracking system 1045. In this way, the varifocal module 1050 can mitigate vergence-accommodation conflict in relation to image light. The varifocal module 1050 can be interfaced (e.g., either mechanically or electrically) with at least one of the electronic display 1025 and at least one optical element of the optical assembly 1030. Then, the varifocal module 1050 may be configured to adjust focus of the one or more images displayed on the electronic display 1025 by adjusting position of at least one of the electronic display 1025 and the at least one optical element of the optical assembly 1030, based on the determined eye tracking information obtained from the eye tracking system 1045. By adjusting the position, the varifocal module 1050 varies focus of image light output from the electronic display 1025 towards the user's eye. The varifocal module 1050 may be also configured to adjust resolution of the images displayed on the electronic display 1025 by performing foveated rendering of the displayed images, based at least in part on the determined eye tracking information obtained from the eye tracking system 1045. In this case, the varifocal module 1050 provides appropriate image signals to the electronic display 1025. The varifocal module 1050 provides image signals with a maximum pixel density for the electronic display 1025 only in a foveal region of the user's eye-gaze, while providing image signals with lower pixel densities in other regions of the electronic display 1025. In one embodiment, the varifocal module 1050 may utilize the depth information obtained by the DCA 1020 to, e.g., generate content for presentation on the electronic display 1025.

The I/O interface 1015 is a device that allows a user to send action requests and receive responses from the console 1010. An action request is a request to perform a particular action. For example, an action request may be an instruction to start or end capture of image or video data or an instruction to perform a particular action within an application. The I/O interface 1015 may include one or more input devices. Example input devices include: a keyboard, a mouse, a game controller, or any other suitable device for receiving action requests and communicating the action requests to the console 1010. An action request received by the I/O interface 1015 is communicated to the console 1010, which performs an action corresponding to the action request. In some embodiments, the I/O interface 1015 includes an IMU 1040 that captures IMU data indicating an estimated position of the I/O interface 1015 relative to an initial position of the I/O interface 1015. In some embodiments, the I/O interface 1015 may provide haptic feedback to the user in accordance with instructions received from the console 1010. For example, haptic feedback is provided when an action request is received, or the console 1010 communicates instructions to the I/O interface 1015 causing the I/O interface 1015 to generate haptic feedback when the console 1010 performs an action.

The console 1010 provides content to the HMD 1005 for processing in accordance with information received from one or more of: the DCA 1020, the HMD 1005, and the I/O interface 1015. In the example shown in FIG. 10, the console 1010 includes an application store 1055, a tracking module 1060, and an engine 1065. Some embodiments of the console 1010 have different modules or components than those described in conjunction with FIG. 10. Similarly, the functions further described below may be distributed among components of the console 1010 in a different manner than described in conjunction with FIG. 10.

The application store 1055 stores one or more applications for execution by the console 1010. An application is a group of instructions, that when executed by a processor, generates content for presentation to the user. Content generated by an application may be in response to inputs received from the user via movement of the HMD 1005 or the I/O interface 1015. Examples of applications include: gaming applications, conferencing applications, video playback applications, or other suitable applications.

The tracking module 1060 calibrates the HMD system 1000 using one or more calibration parameters and may adjust one or more calibration parameters to reduce error in determination of the position of the HMD 1005 or of the I/O interface 1015. For example, the tracking module 1060 communicates a calibration parameter to the DCA 1020 to adjust the focus of the DCA 1020 to more accurately determine positions of structured light elements captured by the DCA 1020. Calibration performed by the tracking module 1060 also accounts for information received from the IMU 1040 in the HMD 1005 and/or an IMU 1040 included in the I/O interface 1015. Additionally, if tracking of the HMD 1005 is lost (e.g., the DCA 1020 loses line of sight of at least a threshold number of structured light elements), the tracking module 1060 may re-calibrate some or all of the HMD system 1000.

The tracking module 1060 tracks movements of the HMD 1005 or of the I/O interface 1015 using information from the DCA 1020, the one or more position sensors 1035, the IMU 1040 or some combination thereof. For example, the tracking module 1050 determines a position of a reference point of the HMD 1005 in a mapping of a local area based on information from the HMD 1005. The tracking module 1060 may also determine positions of the reference point of the HMD 1005 or a reference point of the I/O interface 1015 using data indicating a position of the HMD 1005 from the IMU 1040 or using data indicating a position of the I/O interface 1015 from an IMU 1040 included in the I/O interface 1015, respectively. Additionally, in some embodiments, the tracking module 1060 may use portions of data indicating a position or the HMD 1005 from the IMU 1040 as well as representations of the local area from the DCA 1020 to predict a future location of the HMD 1005. The tracking module 1060 provides the estimated or predicted future position of the HMD 1005 or the I/O interface 1015 to the engine 1055.

The engine 1065 generates a 3D mapping of the area surrounding some or all of the HMD 1005 (i.e., the "local area") based on information received from the HMD 1005. In some embodiments, the engine 1065 determines depth information for the 3D mapping of the local area based on information received from the DCA 1020 that is relevant for techniques used in computing depth. The engine 1065 may calculate depth information using one or more techniques in computing depth from structured light. In various embodiments, the engine 1065 uses the depth information to, e.g., update a model of the local area, and generate content based in part on the updated model.

The engine 1065 also executes applications within the HMD system 1000 and receives position information, acceleration information, velocity information, predicted future positions, or some combination thereof, of the HMD 1005 from the tracking module 1060. Based on the received information, the engine 1065 determines content to provide to the HMD 1005 for presentation to the user. For example, if the received information indicates that the user has looked to the left, the engine 1065 generates content for the HMD 1005 that mirrors the user's movement in a virtual environment or in an environment augmenting the local area with additional content. Additionally, the engine 1065 performs an action within an application executing on the console 1010 in response to an action request received from the I/O interface 1015 and provides feedback to the user that the action was performed. The provided feedback may be visual or audible feedback via the HMD 1005 or haptic feedback via the I/O interface 1015.

In some embodiments, based on the eye tracking information (e.g., orientation of the user's eye) received from the eye tracking system 1045, the engine 1065 determines resolution of the content provided to the HMD 1005 for presentation to the user on the electronic display 1025. The engine 1065 provides the content to the HMD 1005 having a maximum pixel resolution on the electronic display 1025 in a foveal region of the user's gaze, whereas the engine 1065 provides a lower pixel resolution in other regions of the electronic display 1025, thus achieving less power consumption at the HMD 1005 and saving computing cycles of the console 1010 without compromising a visual experience of the user. In some embodiments, the engine 1065 can further use the eye tracking information to adjust where objects are displayed on the electronic display 1025 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
   an optical assembly configured to direct image light to an eye-box of the HMD, the eye-box corresponding to a location of a user's eye; and
   an electronic display configured to emit the image light, the electronic display positioned with respect to an optical axis of the HMD such that a first portion of the image light emitted by a first portion of the electronic display and a second portion of the image light emitted by a second portion of the electronic display appear to originate at different distances from the optical assembly,
   wherein the optical assembly generates a first image plane at a first focal distance by propagating the first portion of the image light and a second image plane at a second focal distance by propagating the second portion of the image light.

2. The HMD of claim 1, wherein:
   the first portion of the electronic display is located above the optical axis; and
   the second portion of the electronic display is located below the optical axis.

3. The HMD of claim 1, wherein:
   the first image plane is associated with a first portion of a field-of-view above the optical axis; and
   the second image plane is associated with a second portion of the field-of-view below the optical axis.

4. The HMD of claim 1, wherein the electronic display is tilted relative to the optical axis.

5. The HMD of claim 1, wherein the electronic display is bent in at least one dimension relative to the optical axis.

6. The HMD of claim 1, wherein the electronic display is curved relative to the optical axis.

7. The HMD of claim 1, wherein the optical assembly comprises a convex lens configured to optically correct at least one of the first portion of the image light and the second portion of the image light.

8. The HMD of claim 1, wherein a secondary element is coupled to the electronic display and is configured to adjust the second portion of the image light emitted from the second portion of the electronic display located below the optical axis such that the second portion of the image light appears at the second image plane.

9. The HMD of claim 8, wherein the secondary element is a wedge element that is coupled to the second portion of the electronic display.

10. The HMD of claim 9, wherein a location of the second image plane is based in part on a thickness of the wedge element.

11. The HMD of claim 8, wherein the secondary element is a rectangular prism that is coupled to the second portion of the electronic display.

12. The HMD of claim 8, wherein the secondary element is a fiber optic faceplate that is coupled to the second portion of the electronic display.

13. The HMD of claim 12, wherein the fiber optic faceplate includes an input surface and an output surface, the input surface receives the image light from the electronic display and the output surface emits the received image light, and a location of the second image plane is based in part on a surface profile of the output surface.

14. The HMD of claim 13, wherein a location of the first image plane is based in part on the surface profile of the output surface.

15. The HMD of claim 13, wherein a thickness of a portion of the fiber optic faceplate that receives image light from the second portion of the electronic display is greater than a thickness of a portion of the fiber optic faceplate that receives image light from the first portion of the electronic display.

16. A head-mounted display (HMD) comprising:
an optical assembly comprising at least one lens that is configured to direct image light to an eye-box of the HMD; and
an electronic display configured to emit the image light, the electronic display positioned with respect to an optical axis of the HMD such that a first portion of the image light emitted by a first portion of the electronic display and a second portion of the image light emitted by a second portion of the electronic display appear to originate at different distances from the optical assembly,
wherein the optical assembly generates a first image plane at a first focal distance by propagating the first portion of the image light and a second image plane at a second focal distance by propagating the second portion of the image light and the first image plane is located farther from the HMD than the second image plane.

17. The HMD of claim 16, wherein the at least one lens comprises a convex lens configured to optically correct at least one of the first portion of the image light and the second portion of the image light.

18. The HMD of claim 16, wherein the electronic display is tilted relative to the optical axis.

19. The HMD of claim 16, wherein a secondary element is coupled to the electronic display and is configured to adjust the second portion of the image light emitted from the second portion of the electronic display located below the optical axis such that the second portion of the image light appears at the second image plane.

20. The HMD of claim 19, wherein the secondary element is selected from a group consisting of: a lens, a wedge element, a rectangular prism, and a fiber optic faceplate.

* * * * *